United States Patent
Kim et al.

(10) Patent No.: US 12,097,456 B2
(45) Date of Patent: Sep. 24, 2024

(54) AIR PURIFIER

(71) Applicant: LG ELECTRONICS INC., Seoul (KR)

(72) Inventors: Myungsang Kim, Seoul (KR); Jihong Kim, Seoul (KR); Hojung Kim, Seoul (KR); Bonggyun Park, Seoul (KR); Yoosool Yoon, Seoul (KR); Cheolyeon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 385 days.

(21) Appl. No.: 17/609,315

(22) PCT Filed: Jun. 11, 2019

(86) PCT No.: PCT/KR2019/007036
§ 371 (c)(1),
(2) Date: Nov. 5, 2021

(87) PCT Pub. No.: WO2020/226223
PCT Pub. Date: Nov. 12, 2020

(65) Prior Publication Data
US 2022/0212133 A1    Jul. 7, 2022

(30) Foreign Application Priority Data

May 7, 2019   (KR) .................. 10-2019-0053318

(51) Int. Cl.
*B01D 46/00*    (2022.01)
*B01D 46/24*    (2006.01)
(Continued)

(52) U.S. Cl.
CPC ......... *B01D 46/0049* (2013.01); *B01D 46/24* (2013.01); *B01D 46/4245* (2013.01);
(Continued)

(58) Field of Classification Search
CPC .............. B01D 46/0049; B01D 46/24; B01D 46/4245; B01D 46/44; B01D 2273/30;
(Continued)

(56) References Cited

U.S. PATENT DOCUMENTS

2004/0118288 A1   6/2004 Kim et al.
2005/0172816 A1   8/2005 Son et al.
(Continued)

FOREIGN PATENT DOCUMENTS

CN         107270199       10/2017
DE    10 2012 002 440       8/2013
(Continued)

OTHER PUBLICATIONS

International Search Report (with English Translation) and Written Opinion dated Feb. 5, 2020 issued in Application No. PCT/KR2019/007036.

(Continued)

*Primary Examiner* — Robert A Hopkins
*Assistant Examiner* — Qianping He
(74) *Attorney, Agent, or Firm* — KED & ASSOCAITES

(57) ABSTRACT

An air purifier according to the present disclosure includes a first blower having a first fan configured to generate an air flow from a first suction part toward a first discharge part, a second blower having a second fan configured to generate an air flow from a second suction part toward a second discharge part, an installation space part configured to be formed between the first blower and the second blower, a power transmitter configured to be positioned inside the installation space part, to be fixed to any one of the first blower and the second blower, and to transmit wireless power, and a power receiver configured to be positioned inside the installation space part, to be fixed to the other one (Continued)

of the first blower and the second blower, and to receive wireless power transmitted from the power transmitter.

17 Claims, 16 Drawing Sheets

(51) Int. Cl.
    *B01D 46/42*     (2006.01)
    *B01D 46/44*     (2006.01)
    *F24F 8/10*     (2021.01)
    *F24F 8/30*     (2021.01)
    *F24F 8/80*     (2021.01)
    *H02J 50/12*     (2016.01)

(52) U.S. Cl.
    CPC ................ *B01D 46/44* (2013.01); *F24F 8/10* (2021.01); *F24F 8/30* (2021.01); *F24F 8/80* (2021.01); *H02J 50/12* (2016.02); *B01D 2273/30* (2013.01)

(58) Field of Classification Search
    CPC ...... H02J 50/12; F24F 8/10; F24F 8/30; F24F 8/80
    USPC .......................................................... 96/397
    See application file for complete search history.

(56) References Cited

U.S. PATENT DOCUMENTS

2017/0246577 A1*   8/2017   Jung ...................... B01D 46/56
2018/0062433 A1*   3/2018   Singh ...................... H04B 1/04

FOREIGN PATENT DOCUMENTS

| GB | 2554893 | | 4/2018 | |
|---|---|---|---|---|
| JP | 2005-219049 | | 8/2005 | |
| KR | 10-2017-0101093 | | 9/2017 | |
| KR | 10-2019-0000114 | * | 1/2019 | |
| KR | 10-2019-0038059 | | 4/2019 | |
| KR | 10-2019-0038978 | | 4/2019 | |
| KR | 2019038059 A | * | 4/2019 | .......... F24F 11/0008 |

OTHER PUBLICATIONS

European Search Report issued in Application No. 19928119.7 dated Dec. 9, 2022.

* cited by examiner

AIR PURIFIER

CROSS-REFERENCE TO RELATED PATENT APPLICATIONS

This application is a U.S. National Stage Application under 35 U.S.C. § 371 of PCT Application No. PCT/KR2019/007036, filed Jun. 11, 2019, which claims priority to Korean Patent Application No. 10-2019-0053318, filed May 7, 2019, whose entire disclosures are hereby incorporated by reference.

TECHNICAL FIELD

The present disclosure relates to an air purifier.

BACKGROUND ART

An air purifier is understood as a device that suctions polluted air, purifies the polluted air, and then discharges the purified air. For example, the air purifier may include a blower for flowing external air in the air purifier and a filter capable of filtering dust, bacteria, or the like in the air.

In general, an air purifier is configured to purify an indoor space such as a home or an office. While the air purifier can purify the surrounding air, there is a problem that it is difficult to purify the air in a space far away from the air purifier. In order to solve this problem, the present applicant has disclosed the following prior document.
1. Publication number (publication date): KR 10-2017-0101093 (Sep. 5, 2017)
2. Title of Invention: Air Purifier According to the prior document, an air purifier in which a first blowing unit and a second blowing unit are disposed in a vertical direction is disclosed. Disclosed is an air purifier capable of discharging air in various directions to the first blowing unit and the second blowing unit disposed in a vertical direction and allowing air to reach a long distance.

However, there is a problem in that the interior of the air purifier is complicated because a plurality of wires are disposed inside the air purifier to supply power to the first blowing unit and the second blowing unit. In addition, since the first blowing unit and the second blowing unit are connected by wiring, it is complicated to separate or couple the first blowing unit and the second blowing unit. In addition, a malfunction of the air purifier is caused by a problem such as a wire disconnection or connecting the wiring incorrectly in the process of separating or combining the first blowing unit and the second blowing unit.

DISCLOSURE

Technical Problem

The present disclosure can provide an air purifier in which the internal structure of the body is simplified.

The present disclosure may provide an air purifier that facilitates coupling or separation of different blowers.

The present disclosure may provide an air purifier capable of adjusting whether power is supplied according to whether different blowers are coupled.

The present disclosure can provide an air purifier capable of removing wires connecting different blowers.

Technical Solution

The air purifier according to the present disclosure can be configured to simplify the internal structure of the air purifier body by removing wires for connecting different blowers. In addition, it is possible to reduce the manufacturing cost of the air purifier by simplifying the internal structure of the air purifier body.

In the air purifier according to the present disclosure, power is supplied from one of the two blowers to the other blower according to whether the first blower and the second blower coupled in the vertical direction are coupled to each other, so that the first blower and the second blower may be operated together.

The air purifier according to the present disclosure can prevent safety accidents that may occur during the power supply process by configuring the blowers to supply power in a wireless power supply method.

Advantageous Effect

According to the present disclosure, it is possible to easily separate or couple a plurality of blowers disposed in the vertical direction.

According to the present disclosure, by removing the wiring for connecting a plurality of blowers, it is possible to prevent a problem that may be caused by wiring between a plurality of blowers.

According to the present disclosure, there is an advantage in that the internal cleaning and maintenance of the air purifier is easy by configuring a plurality of blowers to be easily separated.

According to the present disclosure, since the air purifier is configured by modularizing a blower that transmits wireless power or receives wireless power, the manufacturing cost of the air purifier can be reduced and the manufacturing efficiency of the air purifier can be increased.

According to the present disclosure, since the air purifier is configured as a modularized blower, the user can utilize the modularized blower in various ways.

BEST MODE

Figure 1:
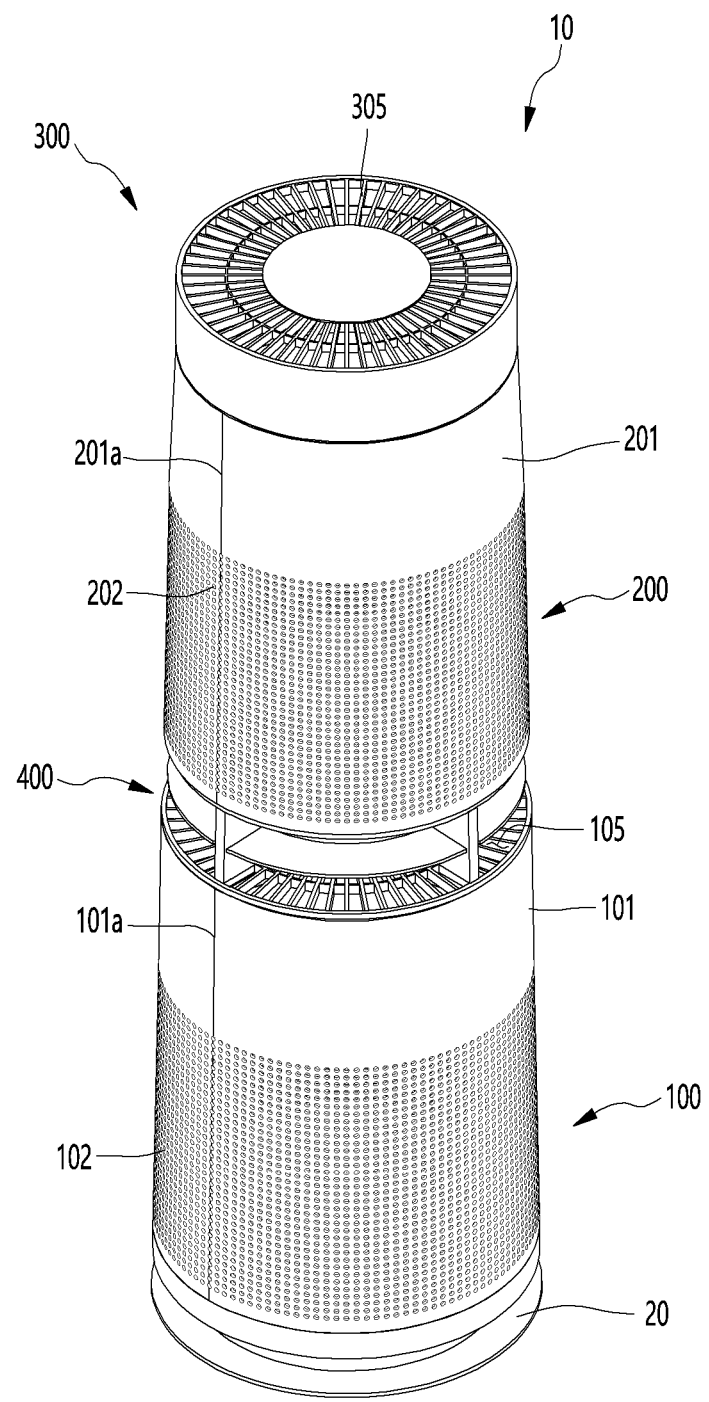
FIG. 1 is a perspective view illustrating an outer appearance of an air purifier according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1 is a perspective view illustrating an outer appearance of an air purifier according to an embodiment of the present disclosure.

Referring to FIG. 1, the air purifier 10 according to an embodiment of the present disclosure includes blowers 100 and 200 for generating an air flow, and a flow change device 300 for changing the discharge direction of the air flow generated by the blowers 100 and 200.

The blowers 100 and 200 include a first blower 100 for generating a first air flow and a second blower 200 for generating a second air flow.

The first blower 100 and the second blower 200 may be disposed in a vertical direction. For example, the second blower 200 may be disposed above the first blower 100. In this case, the first air flow forms a flow for suctioning indoor air existing on the lower side of the air purifier 10, and the second air flow forms for suctioning indoor air existing on the upper side of the air purifier 10.

The air purifier 10 includes cases 101 and 201 that form an outer appearance.

In detail, the cases 101 and 201 include a first case 101 that forms an outer appearance of the first blower 100. The first case 101 may have a cylindrical shape. In addition, the upper portion of the first case 101 may be configured to have a smaller diameter than the lower portion thereof. In other words, the first case 101 may have a conical shape with an end cut off.

The first case 101 includes a first separation part 101a to or from which two parts constituting the first case 101 are coupled or separated. In addition, the first case 101 further includes a hinge part (not illustrated) provided opposite the first separation part 101a. The two parts may rotate about the hinge part.

When at least one of the two parts rotates, the first case 101 is opened and can be separated from the air purifier 10. An engaging device may be provided at a portion where the two parts are coupled, that is, on the opposite side of the hinge part. The engaging device may include an engaging protrusion or a magnet member. By opening the first case 101, internal parts of the first blower 100 may be replaced or repaired.

A first suctioning part 102 through which air is suctioned is formed in the first case 101. The first suctioning part 102 includes a through-hole through which at least a portion of the first case 101 is penetrated. A plurality of first suctioning parts 102 are formed.

The plurality of first suctioning parts 102 are uniformly formed along the outer circumferential surface of the first case 101 in the circumferential direction so that air can be suctioned in any direction with respect to the first case 101. In other words, air may be suctioned in a 360 degree direction based on the vertical center line passing through the inner center of the first case 101.

As described above, since the first case 101 has a cylindrical shape and a plurality of the first suctioning parts 102 are formed along the outer circumferential surface of the first case 101, the amount of air suctioning can be increased. In addition, by avoiding the hexahedral shape having the corners, there is an effect that the flow resistance to the suctioned air can be reduced.

Air suctioned through the first suctioning part 102 may flow in a substantially radial direction from the outer circumferential surface of the first case 101. The direction is defined as follows. Based on FIG. 1, the vertical direction is called an axial direction, and the horizontal direction is called a radial direction. The axial direction may correspond to the central axis direction of the first fan 160 and the second fan 260 to be described below, that is, the motor shaft direction of the fan. In addition, the radial direction may be understood as a direction perpendicular to the axial direction.

In addition, the circumferential direction is understood as an imaginary circle direction formed when rotating with the axial direction as the center and the distance in the radial direction as the rotation radius.

The first blower 100 further includes a base 20 provided under the first case 101 and placed on the ground. The base 20 is positioned downwardly spaced apart from the lower end portion of the first case 101. A base suctioning part 103 is formed in a separation space between the first case 101 and the base 20.

Air suctioned through the base suctioning part 103 may flow upward through the suctioning port 112 of the suctioning grill 110 (refer to FIG. 2) provided on the upper side of the base 20.

In other words, the first blower 100 includes a plurality of suctioning parts 102 and 103. Air existing in the lower part of the indoor space may easily flow into the first blower 100 through the plurality of suctioning parts 102 and 103. Accordingly, the amount of air suctioning can be increased.

A first discharge part 105 is formed at an upper portion of the first blower 100. The first discharge part 105 may be formed on the first discharge grill 195 of the first discharge guide 190 provided in the first blower 100. The first discharge guide 190 forms an outer appearance of the upper end portion of the first blower 100. Air discharged through the first discharge part 105 may flow upward in the axial direction.

The cases 101 and 201 may include a second case 201 that forms an outer appearance of the second blower 200. The second case 201 may have a cylindrical shape. In addition, the upper portion of the second case 201 may be configured to have a smaller diameter than the lower portion thereof. In other words, the second case 201 may have a conical shape with an end cut off.

The second case 201 includes two parts that can be separated or coupled through the second separating part 201a and a hinge part. The second case 201 may be configured to be openable like the first case 101. For a detailed description, the description of the first case 101 is used. By opening the second case 201, internal parts of the second blower 200 may be replaced or repaired.

The diameter of the lower end portion of the second case 201 may be smaller than the diameter of the upper end portion of the first case 101. Accordingly, in view of the overall shape of the cases 101 and 201, the lower cross-sectional areas of the cases 101 and 201 are formed to be larger than the upper cross-sectional areas, and thus the air purifier 10 can be stably supported on the ground.

A second suctioning part 202 through which air is suctioned is formed in the second case 201. The second suctioning part 202 includes a through-hole through which at least a portion of the second case 201 is penetrated. A plurality of second suctioning parts 202 are formed.

The plurality of second suctioning parts 202 are uniformly formed along the outer circumferential surface of the second case 201 in the circumferential direction so that air can be suctioned in any direction with respect to the second case 201. In other words, air may be suctioned in a 360 degree direction based on the vertical center line passing through the inner center of the second case 201.

As described above, since the second case 201 is configured in a cylindrical shape and a plurality of the second suctioning parts 202 are formed along the outer circumferential surface of the second case 201, an amount of air suctioning may be increased. In addition, by avoiding the hexahedral shape having the corners, there is an effect that the flow resistance to the suctioned air can be reduced.

Air suctioned through the second suctioning part 202 may flow from the outer circumferential surface of the second case 201 in a substantially radial direction.

The air purifier 10 includes a partitioning part 400 provided between the first blower 100 and the second blower 200. By the partitioning part 400, the second blower 200 may be positioned to be spaced apart from the upper side of the first blower 100. In this embodiment, the partitioning part 400 may be mounted on the lower portion of the second blower 200. The second blower 200 and the partitioning part 400 may be separated from the first blower 100.

The flow change device 300 may be installed above the second blower 200. Based on the air flow, the air flow path of the second blower 200 may communicate with the air flow path of the flow change device 300. The air that has passed through the second blower 200 may pass through the air flow path of the flow change device 300 and be discharged to the outside through the second discharge part 305. The second discharge part 305 is formed at the upper end portion of the flow change device 300.

The flow change device 300 may be movably provided. For example, the flow change device 300 may be in a lying state (first position) or in an inclined erect state (second position).

A display device (not illustrated) for displaying operation information of the air purifier 10 may be provided at an upper portion of the flow change device 300. The display device may move together with the flow change device 300.

Figure 2:
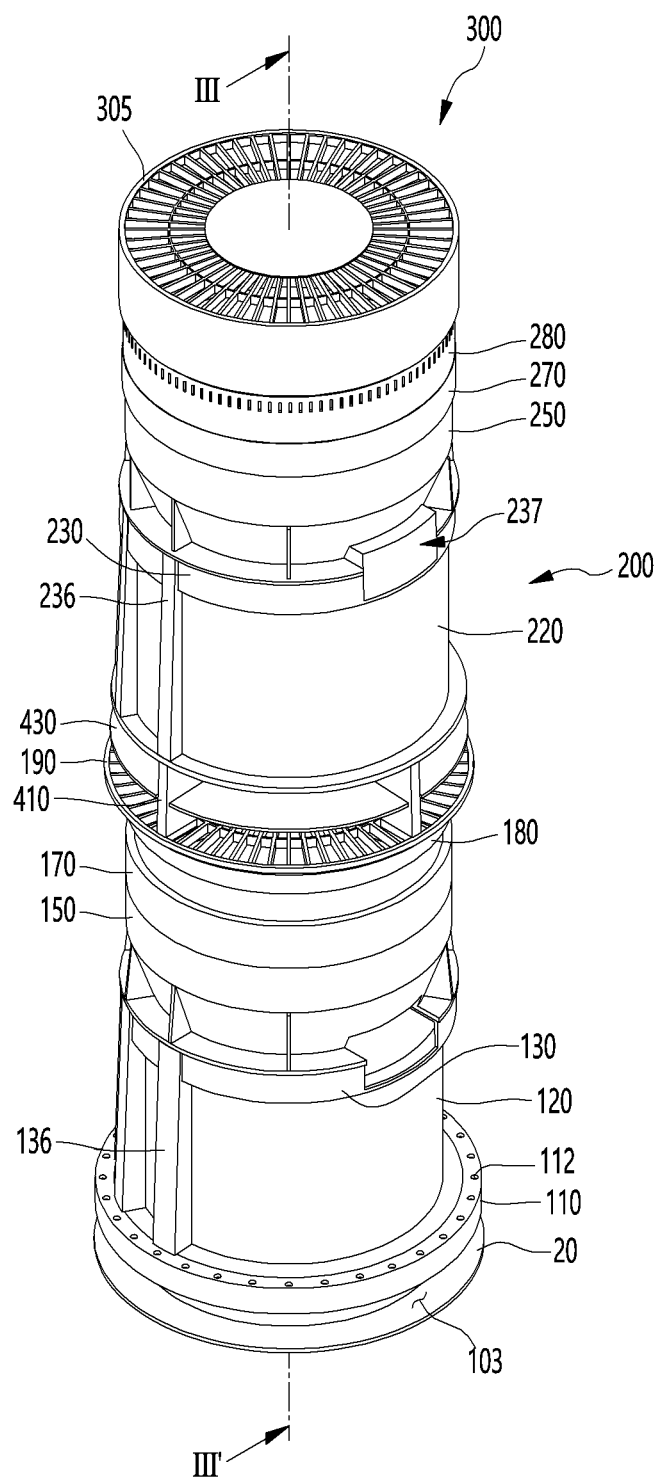
FIG. 2 is a perspective view illustrating an internal configuration of an air purifier according to an embodiment of the present disclosure.
Figure 3:
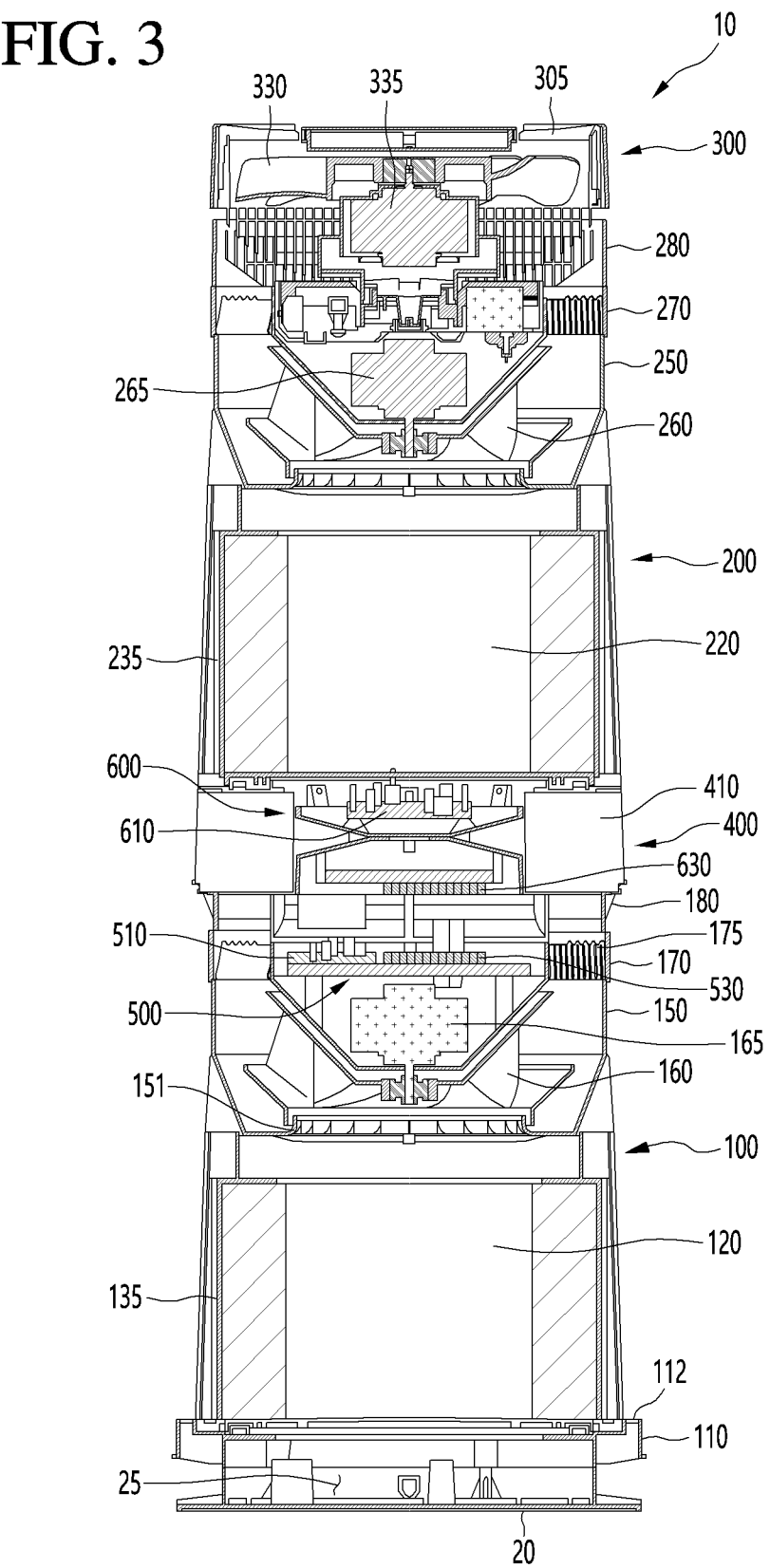
FIG. 3 is a cross-sectional view taken along III-III' of FIG. 2.
Figure 4:
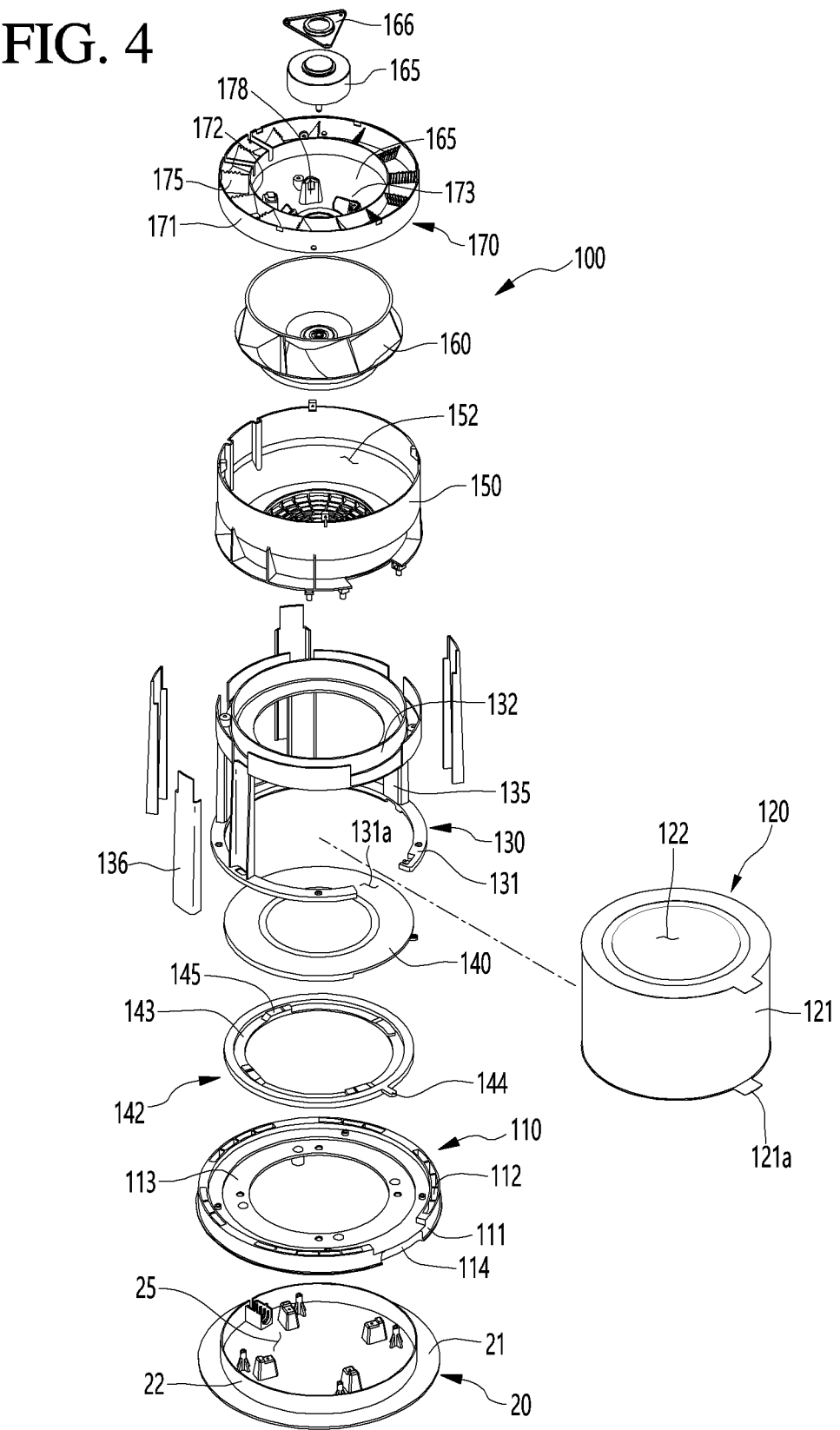
FIG. 4 is an exploded perspective view illustrating the configuration of a first blower according to an embodiment of the present disclosure.
Figure 5:
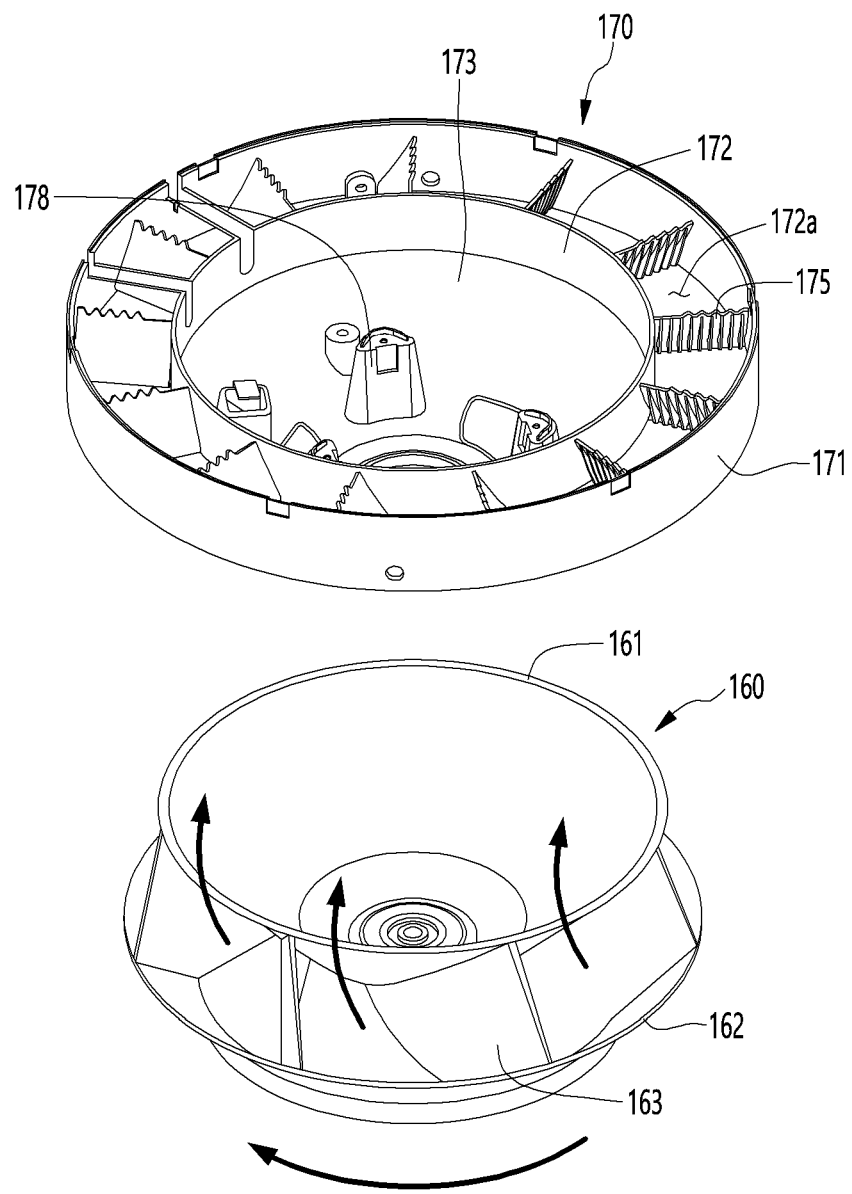
FIG. 5 is an exploded perspective view illustrating the configuration of a first fan and a first guide device according to an embodiment of the present disclosure.
Figure 6:
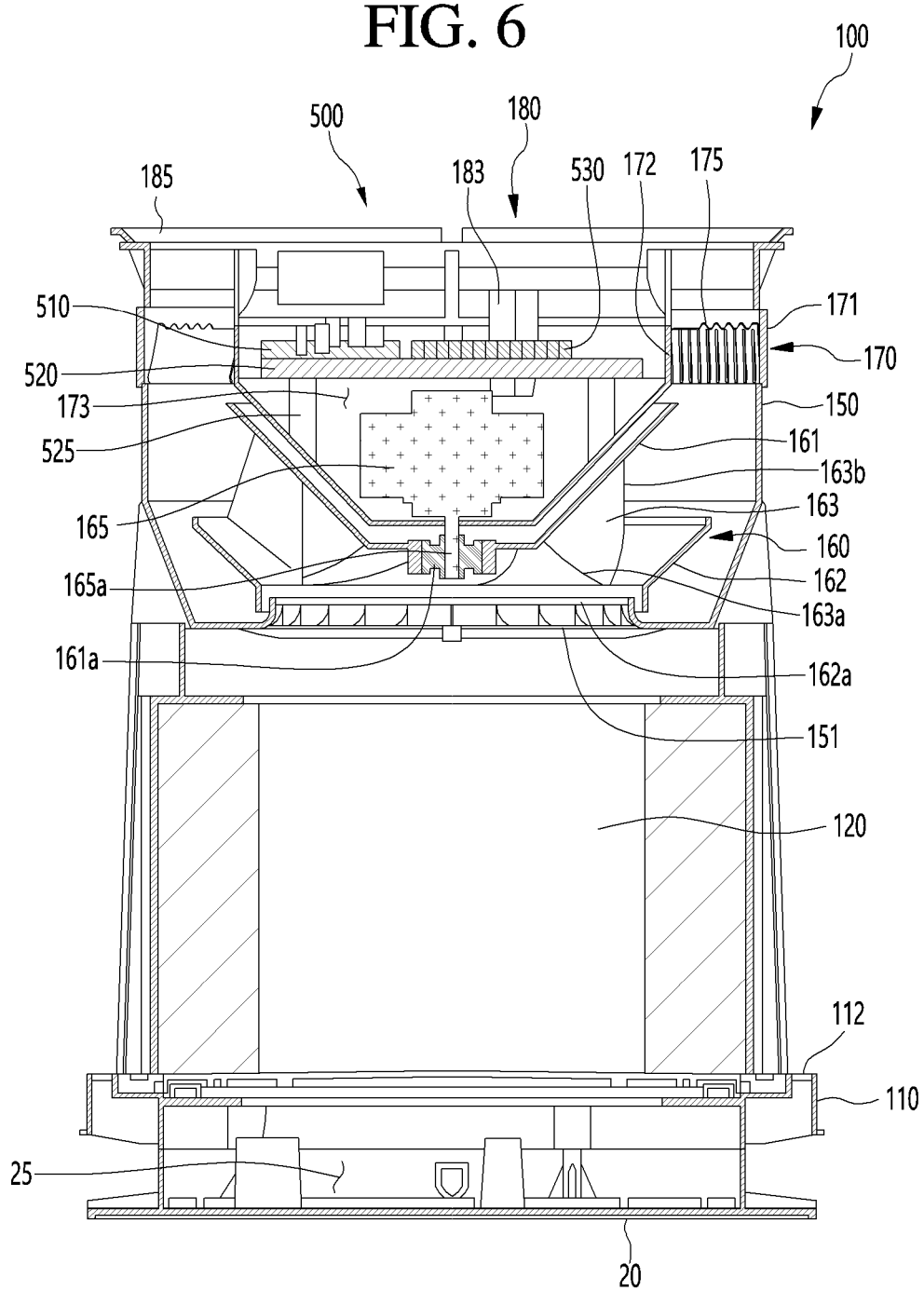
FIG. 6 is a cross-sectional view illustrating a partial configuration of a first blower according to an embodiment of the present disclosure.
Figure 7:
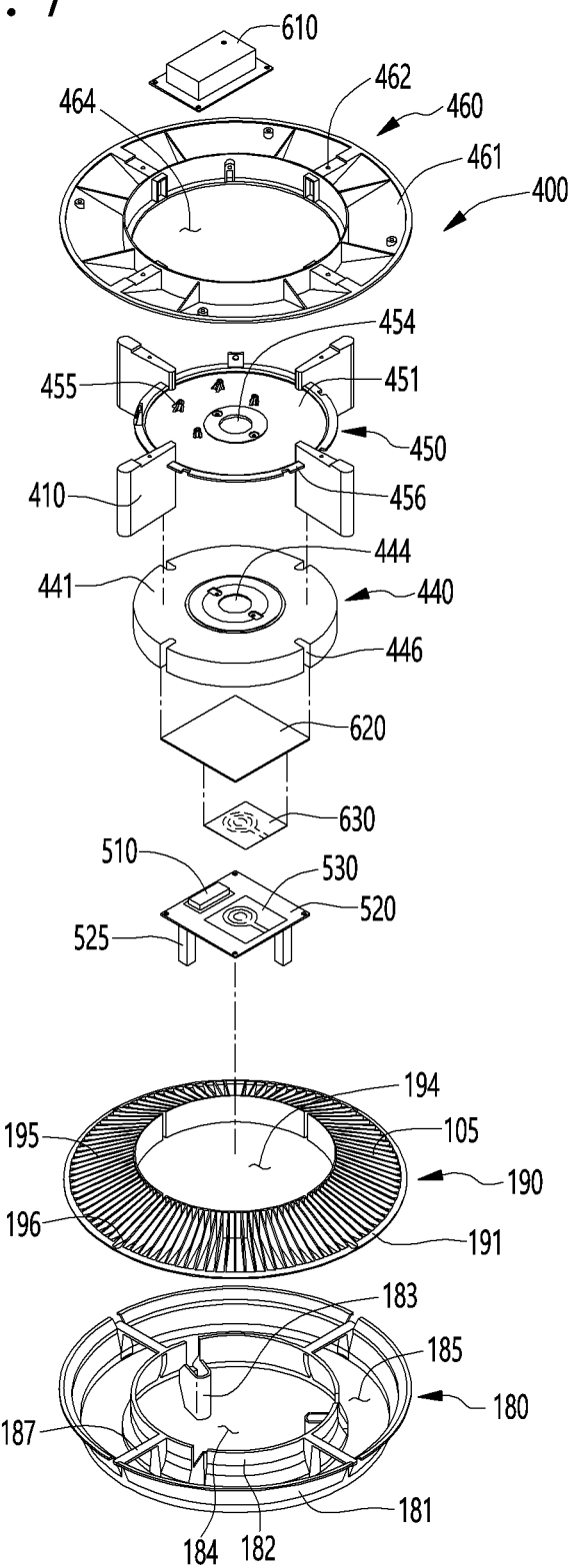
FIG. 7 is an exploded perspective view illustrating a partial configuration of a partitioning part and a first blower according to an embodiment of the present disclosure.

FIG. 2 is a perspective view illustrating an internal configuration of an air purifier according to an embodiment of the present disclosure, FIG. 3 is a cross-sectional view taken along III-III' of FIG. 2, FIG. 4 is an exploded perspective view illustrating the configuration of a first blower according to an embodiment of the present disclosure, FIG. 5 is an exploded perspective view illustrating the configuration of a first fan and a first guide device according to an embodiment of the present disclosure, FIG. 6 is a cross-sectional view illustrating a partial configuration of a first blower according to an embodiment of the present disclosure, and FIG. 7 is an exploded perspective view illustrating a partial configuration of a partitioning part and a first blower according to an embodiment of the present disclosure.

Referring to FIGS. 2 to 7, the first blower 100 according to an embodiment of the present disclosure includes a base 20 and a suctioning grill 110 disposed above the base 20.

The base 20 includes a base main body 21 placed on the ground and a base protrusion 22 protruding upward from the base main body 21 and on which the suctioning grill 110 is placed.

By the base protrusion 22, the base main body 21 and the suctioning grill 110 are spaced apart from each other. Between the base 20 and the suctioning grill 110, a base suctioning part 103 for forming an air suctioning space is provided.

The base 20 may further include an electric space 25 in which a first PCB part 500 to be described below can be installed therein. The first PCB part 500 may be disposed in any one of an installation space part or the electric space 25 to be described below. In this embodiment, it will be described that the first PCB part 500 is disposed in the installation space part. However, when the first PCB part 500 is disposed in the electric space 25, there is an effect that the space utilization of the air purifier is improved.

The suctioning grill 110 includes a substantially ring-shaped grill main body 111 and a suctioning port 112 formed at an edge of the grill main body 111. A plurality of suctioning ports 112 may be provided in a state of being spaced apart along the edge. In addition, the plurality of suctioning ports 112 may communicate with the base suctioning part 103.

Air suctioned through the suctioning port 112 and the base suctioning part 103 may pass through the first filter member 120. In other words, air may pass through the outer circumferential surface of the cylindrical first filter member 120 and flow into the first filter member 120. In other words, the first filter member 120 may have a cylindrical shape and have a filter surface for filtering air.

In the suctioning grill 110, a lever supporting part 113 that forms an upper surface of the grill main body 111 and supports the first lever device 142, and a groove part 114 formed to be recessed in the inner radial direction from an outer circumferential surface of the grill main body 111 are further provided. The groove part 114 may provide a space in which the first handle 144, which will be described below, can move.

The first blower 100 includes a first lever device 142 provided above the suctioning grill 110 and operable by a user.

The first lever device 142 includes a lever main body 143 that has a substantially ring shape and is rotatably provided.

The lever main body 143 includes a lever protrusion 145 provided on the edge of the lever main body 143. The lever protrusion 145 may protrude upward from the upper surface of the edge of the lever main body 143 and a plurality of lever protrusion may be provided in a state of being spaced apart from each other. The plurality of lever protrusions 145 is understood as a configuration having an inclined surface in order to move the first support device 140 to be described below upward or downward.

A first handle 144 is provided on the outer circumferential surface of the lever main body 143. The user may rotate the lever main body 143 clockwise or counterclockwise by griping the first handle 144.

A first support device 140 for supporting the first filter member 120 is provided above the first lever device 142. The first lever device 142 supports the lower surface of the first support device 140. A support protrusion (not illustrated) in contact with the lever protrusion 145 may be provided in the first support device 140. The support protrusion may protrude downward from the lower surface of the first support device 140, and a plurality of support protrusions may be provided in the number corresponding to the lever protrusion 145. In addition, the support protrusion includes an inclined surface.

While the lever main body 143 rotates, the lever protrusion 145 may be rotated together with the lever main body 143. At this time, when the upper portion of the lever protrusion 145 comes into contact with the lower portion of the support protrusion, the lever main body 143 pushes the first supporting device 140 upward. When the first supporting device 140 moves upward, the first filter member 120 is in a state of being coupled to the first blower 100.

On the other hand, when the lower portion of the lever protrusion 145 comes into contact with the upper portion of the support protrusion, the first supporting device 140 descends downward. In addition, when the first support device 140 descends downward, the first filter member 120 is in a separable state (released state) from the first blower 100.

The first blower 100 further includes a first filter frame 130 forming a mounting space for the first filter member 120. In detail, the first filter frame 130 includes a first frame 131 forming a lower portion of the first filter frame 130 and a second frame 132 forming an upper portion of the first filter frame 130.

The first frame 131 has a ring shape in which approximately a portion thereof is cut off. The ring-shaped inner space of the first frame 131 forms at least a portion of an air flow path passing through the first filter frame 130.

The first lever device 142 and the first support device 140 may be positioned on the inner circumferential side of the first frame 131. The upper surface of the first supporting device 140 includes a seating surface on which the first filter member 120 is placed. In addition, a first handle space part 131a allowing the first handle 144 of the first lever device 142 to be manipulated is defined in the cut-out partial space of the first frame 131. The first handle 144 is positioned in the first handle space part 131a and may be manipulated in a clockwise or counterclockwise direction.

The second frame 132 is positioned upwardly spaced apart from the first frame 131. The second frame 132 has a substantially ring shape. The ring-shaped inner space of the second frame 132 forms at least a portion of an air flow path passing through the first filter frame 130. In addition, an upper portion of the second frame 132 may support a first fan housing 150 to be described below.

The first filter frame 130 further includes a first filter support part 135 extending upwardly from the first frame 131 toward the second frame 132. The first and second frames 131 and 132 may be spaced apart from each other by the first filter support part 135. A plurality of first filter support parts 135 may be provided, and the plurality of first filter support parts 135 may be arranged in a circumferential direction to be connected to edges of the first and second frames 131 and 132.

A mounting space of the first filter member 120 is defined by the first and second frames 131 and 132 and the plurality of first filter support parts 135.

In the mounting space, the first filter member 120 may be detachably mounted. The first filter member 120 has a cylindrical shape, and air may flow through the outer circumferential surface of the first filter member 120 thereinto. In the process of passing through the first filter member 120, impurities such as fine dust in the air may be filtered out.

The first filter member 120 may be formed in a cylindrical shape. The first filter member 120 includes one or more filter parts 121. The filter part 121 may form an inflow surface in which air flows. The upper end and lower end of the filter part 121 may be fixed by a filter frame. The filter frame disposed at the lower end of the filter part 121 may be referred to as a first filter frame. The filter frame disposed on the upper end of the filter part 121 may be referred to as a second filter frame. At least one of the first and second filter frames further includes a handle 121a. The first filter member 120 includes an outlet 122 through which the air passing through the filter part 121 is discharged. The outlet 122 is disposed in the axial direction of the first filter member 120. In other words, the air flowing in the radial direction through the filter part 121 may flow in the axial direction through the outlet 122.

Since the first filter member 120 has a cylindrical shape, air can flow in any direction with respect to the first filter member 120. Accordingly, the filtering area of the air can be increased.

The mounting space may be provided in a cylindrical shape corresponding to the shape of the first filter member 120. The first filter member 120 may be slidably retracted toward the mounting space during the mounting process. Conversely, the first filter member 120 may be slidably drawn out from the mounting space during the separation process.

In other words, when the first handle 144 is manipulated while the first filter member 120 is placed on the upper surface of the first support device 140, the first filter member 120 is in the released position while moving downward. In addition, the first filter member 120 may be separated from the mounting space by sliding outward in the radial direction.

On the other hand, in a state where the first filter member 120 is separated from the mounting space, the first filter member is slid radially inward toward the mounting space to be supported on the upper surface of the first support device 140, and the first filter member can be in close contact upward by the manipulation of the first handle 144. At this time, the first filter member 120 is in the coupled position.

Meanwhile, the first support part cover 136 may be coupled to the outside of the first filter support part 135.

The first blower 100 further includes a first fan housing 150 installed at the outlet side of the first filter member 120. A first fan 160 is received in the first fan housing 150. In addition, the first fan housing 150 may be supported by the first filter frame 130.

A first fan inlet 151 for guiding the inflow of air into the first fan housing 150 is provided at a lower portion of the first fan housing 150. A grill is provided in the first fan inlet 151 to prevent a user from inserting a finger or the like into the inside of the first fan housing 150 when the first filter member 150 is separated.

The first fan 160 is placed above the first fan inlet 151. For example, the first fan 160 includes a centrifugal fan that flows air in an axial direction and discharges air upward in a radial direction.

In detail, the first fan 160 includes a hub 161 to which a rotation shaft 165a of a first fan motor 165, which is a centrifugal fan motor, is coupled, a shroud 162 disposed in a state of being spaced apart from the hub 161, and a plurality of blades 163 disposed between the hub 161 and the shroud 162. The first fan motor 165 may be coupled to the upper side of the first fan 160.

The hub 161 may have a bowl shape in which the diameter thereof becomes narrower toward the lower side. In addition, the hub 161 includes a shaft coupling part to which the rotation shaft 165a is coupled, and a first blade coupling part extending obliquely upward from the shaft coupling part.

The shroud 162 includes a lower end portion in which a shroud suctioning port 162a through which air passing through the first fan inlet 151 is suctioned is formed, and a second blade coupling part extending upward from the lower end part.

One surface of the blade 163 may be coupled to the first blade coupling part of the hub 161, and the other surface thereof may be coupled to the second blade coupling part of the shroud 162. In addition, the plurality of blades 163 may be disposed to be spaced apart from each other in a circumferential direction of the hub 161.

The blade 163 includes a leading edge 163a forming a side end portion in which air flows and a trailing edge 163b forming a side end portion at which air is discharged.

The air passing through the first filter member 120 flows upward and flows into the first fan housing 150 through the first fan inlet 151. In addition, the air flows in the axial direction of the first fan 160, flows into the first leading edge 163a, and flows out to the trailing edge 163b through the blade 163.

At this time, so that the air flowing out through the trailing edge 163b can flow upward in the radial direction, the trailing edge 163b may extend obliquely upward and outward with respect to the axial direction corresponding to the flow direction of the air.

The first blower 100 further includes a first air guide 170 coupled to the upper side of the first fan 160 to guide the flow of air passing through the first fan 160.

The first air guide 170 includes an outer wall 171 having a cylindrical shape and an inner wall 172 positioned inside the outer wall 171 and having a cylindrical shape. The outer wall 171 is disposed to surround the inner wall 172. A first air flow path 172a through which air flows is formed between the inner circumferential surface of the outer wall 171 and the outer circumferential surface of the inner wall 172.

The first air guide 170 includes a guide rib 175 disposed in the first air flow path 172a. The guide rib 175 extends from the outer circumferential surface of the inner wall 172 to the inner circumferential surface of the outer wall 171. A plurality of the guide ribs 175 may be disposed to be spaced apart from each other. The plurality of guide ribs 175 perform a function of upwardly guiding the air flowing into the first air flow path 172a of the first air guide 170 through the first fan 160.

The guide rib 175 may extend obliquely upward from the lower portions of the outer wall 171 and the inner wall 172. For example, the guide rib 175 is formed to be round and guides the air to flow in an inclined upward direction.

The first air guide 170 further includes a motor receiving part 173 extending downward from the inner wall 172 to receive the first fan motor 165. The motor receiving part 173 may have the shape of a bowl whose diameter decreases toward the bottom. A motor coupling part 166 is provided on one side of the first fan motor 165, and the motor coupling part 166 guides to fix the first fan motor 165 to the first air guide 170.

The motor receiving part 173 may include a fastening rib 178. The motor coupling part 166 may be fastened to the fastening rib 178 by a fastening member. The fastening rib 178 may be provided to protrude upward from the upper surface of the motor receiving part 173. A plurality of fastening ribs 178 may be provided.

The shape of the motor receiving part 173 may correspond to the shape of the hub 161. In addition, the motor receiving part 173 may be inserted inside the hub 161.

The first fan motor 165 may be supported on the upper side of the motor receiving part 173. In addition, the rotating shaft 165a of the first fan motor 165 extends downward from the first fan motor 165 and penetrates the bottom of the motor receiving part 173 to couple to the shaft coupling part 161a of the hub 161.

The first blower 100 further includes a second air guide 180 coupled to the upper side of the first air guide 170 and guiding the air passing through the first air guide 170 to the first discharge guide 190. The first air guide 170 and the second air guide 180 may be integrally formed.

The second air guide 180 includes a first guide wall 181 having a substantially cylindrical shape, and a second guide wall 182 positioned inside the first guide wall 181 and having a substantially cylindrical shape. The first guide wall 181 may be disposed to surround the second guide wall 182.

A second air flow path 185 through which air flows is formed between the inner circumferential surface of the first guide wall 181 and the outer circumferential surface of the second guide wall 182. The air flowing through the first air flow path 172a of the first air guide 170 passes through the second air flow path 185 and flows upward.

A fastening guide 183 coupled to the first air guide 170 is provided under the second guide wall 182. The fastening guide 183 may extend below the second guide wall 182.

A predetermined fastening member is coupled to the fastening guide 183, and the fastening member may be coupled to the fastening rib 178 of the first air guide 170. The fastening rib 178 may be provided to protrude upwardly from the upper surface of the motor receiving part 173. In addition, a plurality of fastening guides 183 and a plurality of fastening rib 178 may be provided.

The second air guide 180 further includes a leg support part 187 extending from an inner circumferential surface of the first guide wall 181 to an outer circumferential surface of the second guide wall 182 to support a leg 410 to be described below. The leg support part 187 includes an upper surface to support the lower surface of the leg 410. In addition, a plurality of the leg support parts 187 may be provided.

A first space part 184 in which at least a portion of the first PCB part 500 is received is formed inside the second guide wall 182 having a cylindrical shape. For example, a portion of the first PCB 510, the first support plate 520, and the power transmitter 530 of the first PCB part 500 may be positioned in the first space part 184.

The first blower 100 may further include a first discharge guide 190 which is disposed on the upper side of the second air guide 180, that is, at the outlet side of the air flow based on the air flow path and guides the air discharge to the outside of the air purifier 10.

The first discharge guide 190 includes a first discharge main body 191 forming a second space part 194 in a substantially central portion. For example, the first discharge main body 191 may have an annular shape.

At least a portion of the first PCB part 500 may be received in the second space part 194. For example, the remaining portions of the first PCB 510, the first support plate 520, and the power transmitter 530 of the first PCB part 500 may be positioned in the second space part 194. The second space part 194 is formed above the first space part 184, and together with the first space part 184, forms an installation space part in which the first PCB part 500 is installed. In addition, the installation space part may be formed so that the first space part 184, the second space part 194, and the motor receiving part 173 communicate with each other. At least one of the first space part 184, the second space part 194, and the motor receiving part 173 may be referred to as a lower space part forming a portion of the installation space part.

Meanwhile, the second space part 194 may be exposed to the external space when the partitioning part 400 to be described below is separated from the first blower 100. The second space part 194 exposed to the external space may be shielded by a second space part cover (not illustrated). The second space part cover may be understood as a separate configuration for covering the second space part 194. The second space part cover may prevent foreign substances from flowing into the first PCB part 500 to be described below by shielding the opened second space part 194. In addition, the second space part cover further includes a display part. The display part provided on the second space part cover may display the operating state of the first blower 100. In addition, the second space part cover can be used as a charging support part on which a terminal that can be charged by wireless power transmitted from a power transmitter 530, which will be described below, is seated. The terminal seated on the second space part cover or the like may be charged by wireless power transmitted from the power transmitter 530.

The first blower 100 includes a first PCB part 500. The first PCB part 500 includes a first PCB 510. The first PCB 510 may control components included in the first blower 100. The first PCB 510 may be referred to as a first control part 510.

The first PCB part 500 may include a first support plate 520 and a first support 525. The first support plate 520 may be formed in a plate shape. The first PCB 510 may be fixed to the first support plate 520. The first PCB 510 may be positioned on the upper surface of the first support plate 520. In this embodiment, the first support plate 520 may be disposed above the first fan motor 165. In the first support 525, a bottom surface of the first support plate 520 may extend toward the motor receiving part 173 of the first fan housing 150. The first support 525 may be fastened to and fixed to the motor receiving part 173. The first support plate 520 may be positioned in the installation space part. The first support 525 may be positioned at least in the motor receiving part 173.

The first PCB part 500 includes a power transmitter 530. The power transmitter 530 may transmit wireless power. The power transmitter 530 may transmit wireless power to the second blower 200. The second blower 200 may be operated by wireless power transmitted from the power transmitter 530. The operation of the power transmitter 530 may be controlled by the first PCB 510. The power transmitter 530 may be fixed to the upper surface of the first support plate 520.

The first discharge main body 191 includes a first discharge grill 195. A plurality of the first discharge grills 195 are provided, and a first discharge part 105 through which air can be discharged to the outside is formed between the plurality of first discharge grills 195. The plurality of first discharge grills 195 are disposed above the second air flow path 185, and the air passing through the second air flow path 185 flows toward the first discharge grill 195 and may be discharged through the first discharge part 105.

The first discharge main body 191 includes a leg insertion part 196 into which the leg 410 is inserted. The leg insertion part 196 may be formed between the first discharge grill 195 of any one of the plurality of first discharge grills 195 and the other first discharge grill 195. A plurality of the leg insertion parts 196 may be provided corresponding to the number of the legs 410. The leg 410 is inserted into the leg insertion part 196 to extend downward and may be seated on the leg support part 187.

A partitioning part 400 is installed above the first discharge guide 190. The partitioning part 400 may be disposed between the first blower 100 and the second blower 200. The second blower 200 may be spaced upwardly from the first blower 100 by the partitioning part 400. The air discharged from the first blower 100 may be discharged in a direction toward the external space by the partitioning part 400. Also, the first blower 100 and the second blower 200 may be partitioned by the partitioning part 400.

Figure 8:
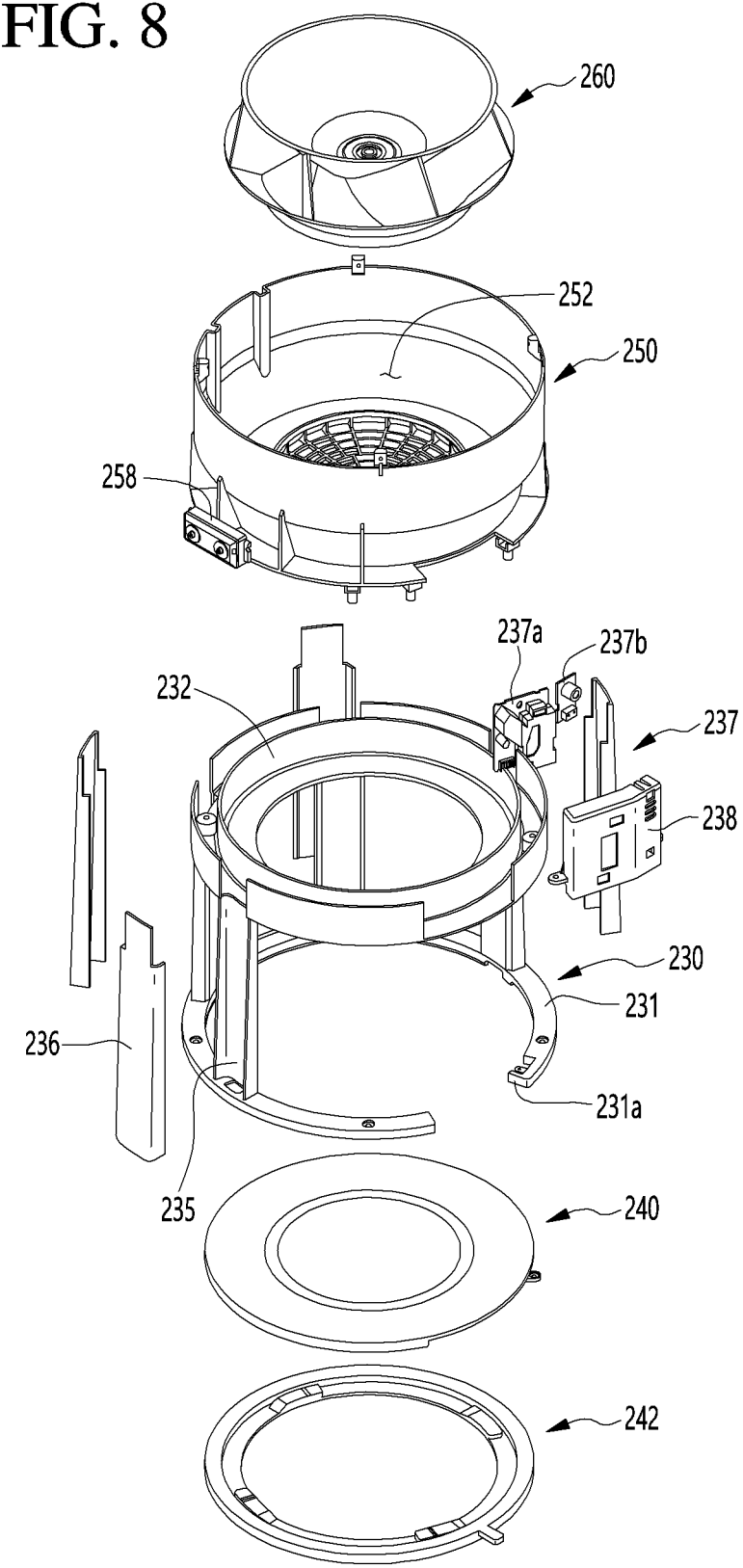
FIGS. 8 and 9 are exploded perspective views illustrating the configuration of a second blower according to an embodiment of the present disclosure.
Figure 9:
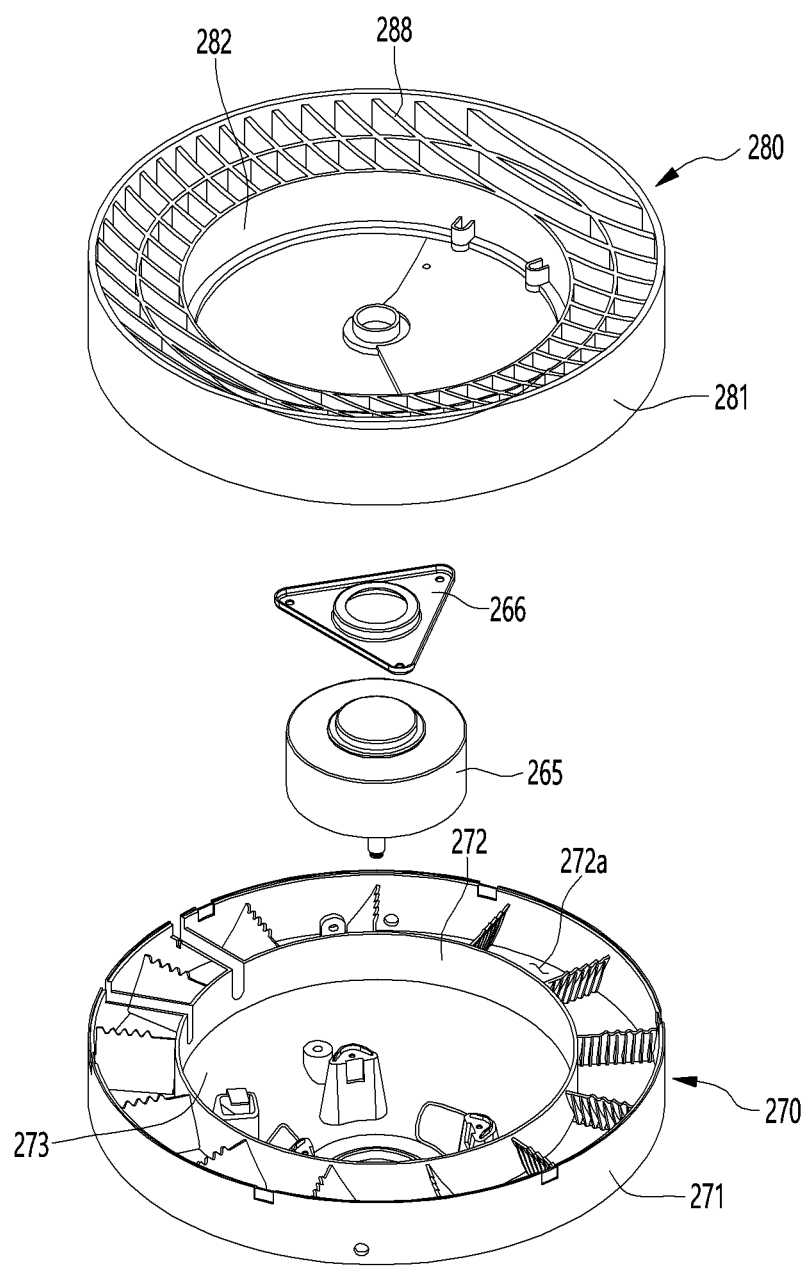
Figure 10:
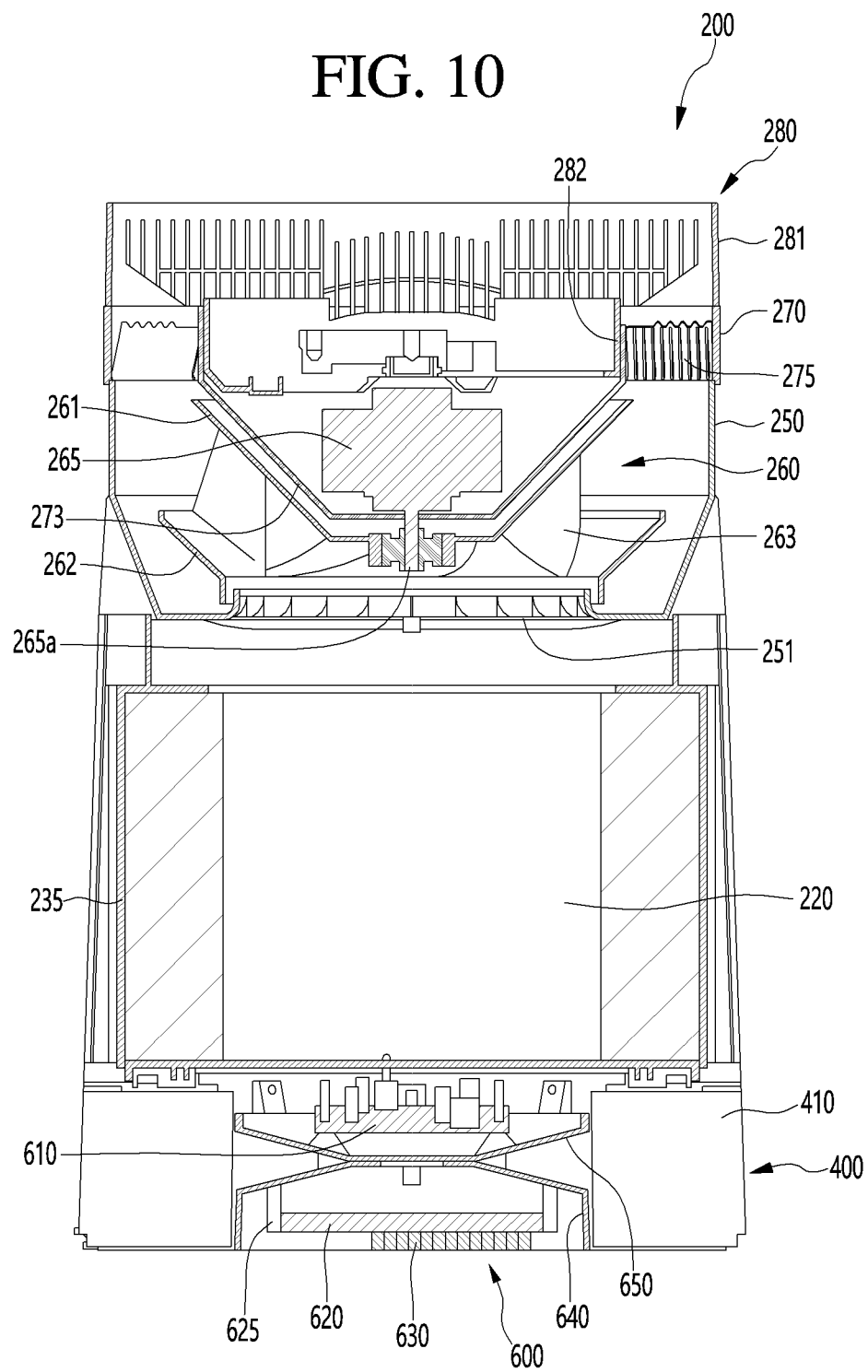
FIG. 10 is a cross-sectional view illustrating the configuration of a second blower according to an embodiment of the present disclosure.

FIGS. 8 and 9 are exploded perspective views illustrating the configuration of a second blower according to an embodiment of the present disclosure, and FIG. 10 is a cross-sectional view illustrating the configuration of a second blower according to an embodiment of the present disclosure.

Referring to FIGS. 7 and 8 to 10 together, the second blower 200 according to an embodiment of the present disclosure includes a second support device 240, a second lever device 242, a second filter member 220, a second filter frame 230, a second fan housing 250, and a second fan 260. These configurations are similar to the parts provided in the first blower 100. Hereinafter, these configurations it will be briefly described, and it is noted in advance that the description of the first blower 100 can be used for the same part.

The second support device 240 is provided to be movable upward or downward by manipulation of a handle provided on the second lever device 242 and supports the second filter member 220. When the second support device 240 moves upward, the second filter member 220 is in a state of being coupled to the second blower 200. On the other hand, when the second support device 240 moves downward, the second filter member 220 is in a detachable state, that is, in a released state from the second blower 200.

As described in the first lever device 142 and the first support device 140 of the first blower 100, the second lever device 242 includes a lever protrusion and the second support device 240 includes a support protrusion. As the lever protrusion and the support protrusion interact with each other, the second support device 240 may be moved upwardly or downwardly. For a detailed description, the description of the first blower 100 is used.

The second filter member 220 is provided in a cylindrical shape. The air suctioned through the second suctioning part 202 of the second case 201 may pass through the outer circumferential surface of the second filter member 220 to flow inside the second filter member 220. In other words, the second filter member 220 may have a cylindrical shape filter surface for filtering air.

The second filter frame 230 includes a first frame 231 forming a lower portion of the second filter frame 230 and forming a second handle space part 231*a*, a second frame 232 forming an upper portion of the second filter frame 230, a second filter support part 235 extending upward from the first frame 231 toward the second frame 232, and a second support part cover 236 covering the second filter support part 235. The description of the second filter member 220 and the second filter frame 230 uses the description of the first filter member 120 and the first filter frame 130 of the first blower 100.

The second blower 200 further includes a sensor device 237. The sensor device 237 may include a dust sensor 273*a* for detecting an amount of dust in the air and a gas sensor 273*b* for detecting an amount of gas in the air. In addition, the sensor device 237 further includes a sensor cover 238 capable of covering at least one side of the sensors 273*a* and 273*b*. For example, the sensors 273*a* and 273*b* may be disposed to be supported by the second frame 232 of the second filter frame 230. Meanwhile, the sensor device 237 may be provided in the first blower 100. The sensor device provided to the first blower 100 may be referred to as a first sensor device. The sensor device provided to the second blower 200 may be referred to as a second sensor device. The first sensor device may be disposed to be supported by the second frame 132 of the first filter frame 130.

The second fan housing 250 includes a second fan receiving part 252 in which the second fan 260 is received. The second fan housing 250 includes a second fan inlet 251 provided under the second fan housing 250 and guiding the inflow of air into the second fan housing 250.

The second fan 260 includes a hub 261 to which a rotation shaft 265*a* of a second fan motor 265, which is a centrifugal fan motor, is coupled, a shroud 262 spaced apart from the hub 261, and a plurality of blades 263 disposed between the hub 261 and the shroud 262. The description of the second fan housing 250 and the second fan 260 uses the description of the first fan housing 150 and the first fan 160 of the first blower 100.

The second blower 200 further includes an ionizer 258 for removing or sterilizing odor particles in the air. The ionizer 258 is coupled to the second fan housing 250 and may act on air flowing inside the second fan housing 250. The ionizer 258 may be provided in the first blower 100. The ionizer provided to the second blower 200 may be referred to as a second ionizer. The ionizer provided to the first blower 100 may be referred to as a first ionizer. The first ionizer may be coupled to the first fan housing 150 and act on air flowing through the inner portion of the first fan housing 150.

The second blower 200 further includes a third air guide device 270 coupled to the upper side of the second fan 260 to guide the flow of air passing through the second fan 260.

The third air guide device 270 includes an outer wall 271 having a cylindrical shape and an inner wall 272 positioned inside the outer wall 271 and having a cylindrical shape. A first air flow path 272*a* through which air flows is formed between the inner circumferential surface of the outer wall 271 and the outer circumferential surface of the inner wall 272.

In addition, the third air guide device 270 includes a guide rib 275 disposed in the first air flow path 272*a*. The guide rib 275 extends from an outer circumferential surface of the inner wall 272 to an inner circumferential surface of the outer wall 271.

The third air guide device 270 further includes a motor receiving part 273 extending downward from the inner wall 272 to receive the second fan motor 265. The motor receiving part 273 may have the shape of a bowl whose diameter decreases toward the bottom.

The second fan motor 265 is coupled to the upper side of the second fan 260 to provide a driving force to the second fan 260. In addition, a motor coupling part 266 is provided on one side of the second fan motor 265, and the motor coupling part 266 guides the second fan motor 265 to be fixed to the third air guide device 270.

Among the configurations of the third air guide device 270, the description of the outer wall 271, the inner wall 272, the guide rib 275, and the motor receiving part 273 uses the description of the corresponding configuration of the first air guide 170. In addition, the description of the second fan motor 265 and the motor coupling part 266 uses the description of the first fan motor 165 and the motor coupling part 166.

Meanwhile, the third air guide device 270 may further include a guide device (not illustrated) for guiding the movement of the flow adjusting device 300.

The second blower 200 includes a second discharge guide device 280 which is installed above the third air guide device 270 and guides the flow of air passing through the third air guide device 270.

The second discharge guide device 280 may have a substantially annular shape with an empty interior. In detail, the second discharge guide device 280 includes the discharge outer wall 281 which forms the outer circumferential surface of the second discharge guide device 280 and has a cylindrical shape and a discharge inner wall 282 which is positioned inside the discharge outer wall 281, forms an inner circumferential surface of the second discharge guide device 280, and has a cylindrical shape.

The discharge outer wall 281 is disposed to surround the discharge inner wall 282. Between the inner circumferential surface of the discharge outer wall 281 and the outer circumferential surface of the discharge inner wall 282, a discharge flow path through which the air that has passed through the third air guide device 270 flows is formed. The discharge flow path may be positioned above the air flow path provided with the guide rib 275.

The second discharge guide device 280 further includes a second discharge grill 288 disposed in the discharge flow path. The second discharge grill 288 extends from an outer circumferential surface of the discharge inner wall 282 to an inner circumferential surface of the discharge outer wall 281.

A partitioning part 400 may be fixed to a lower side of the second blower 200. The partitioning part 400 may be coupled to the first blower 100. In a state where the partitioning part 400 is fixed to the second blower 200, it may be separated from or coupled to the first blower 100. In other words, the partitioning part 400 may define a bottom surface of the second blower 200 when the second blower 200 is separated from the first blower 100. The partitioning part 400 may further include a base for placing the second blower 200 on a bottom surface.

The user can use only the first blower 100 by separating the second blower 200 and the partitioning part 400 from the first blower 100. The air purifier 10 according to the present disclosure may be operated by using a single-stage air purifier using only the first blower 100 and a two-stage air purifier obtained by combining the second blower 200 and the partitioning part 400.

The partitioning part 400 includes legs 410 for separating the first and second blowers 100 and 200 from each other. A separation space between the first and second blowers 100 and 200 may be defined by the legs 410. A plurality of the legs 410 may be provided while being spaced apart in the circumferential direction. In addition, the leg 410 may extend from the lower part of the separation space toward the upper part thereof, that is, in the axial direction.

Through the separation space, the air discharged from the first blower 100, that is, the air discharged from the first discharge part 105 of the first discharge guide 190 may flow easily.

The partitioning part 400 further includes a blocking wall 430 installed between the plurality of legs 410 and extending in a radial direction, that is, a horizontal direction. By the blocking wall 430, the separation space may be divided into an upper space and a lower space.

The air discharged from the first discharge part 105 may be discharged to the outside of the air purifier 10 via a lower space under the blocking wall 430. By the blocking wall 430, it is possible to prevent the air discharged from the first discharge part 105 from flowing into the side of the second blower 200.

The partitioning part 400 includes a space part cover 440. The space part cover 440 may cover an upper side of the second space part 194 to block communication between the second space part 194 and the first discharge part 105. Accordingly, the air discharged from the first discharge part 105 may be prevented from flowing into the second space part 194 by the space part cover 440.

The space part cover 440 includes a cap-shaped cover main body 441. Due to the cap shape, the upper space of the second space part 194 of the cover main body 441 can be easily shielded.

A first through-hole 444 through which a wiring or a harness provided in the second blower 200 passes is formed in the cover main body 441. The first through-hole 444 may be formed in a substantially central portion of the upper surface part of the cover main body 441.

The harness is understood as a wire bundle. The wiring or harness may include a wiring connecting the second PCB 610 and the power receiving part 630 to be described below.

A first leg groove 446 is formed on the outer circumferential surface of the cover main body 441. The first leg groove 446 may have a shape recessed from the outer circumferential surface of the cover main body 441 and may be configured to insert at least a portion of the leg 410. A plurality of the first leg grooves 446 may be provided corresponding to the number of the legs 410.

The partitioning part 400 includes a PCB support part 450. The PCB support part 450 may have a substantially disk shape and may be configured to have a narrower cross-sectional area toward the bottom. The PCB support part 450 may be disposed above the space part cover 440. The PCB support part 450 and the space part cover 440 may be coupled to each other in the vertical direction. The second PCB 610 may be supported on the upper surface of the PCB support part 450.

A fixing protrusion 455 for fixing the second PCB 610 is provided on the upper surface of the PCB support part 450. A predetermined fastening member may be coupled to the fixing protrusion 455. The fastening member couples the second PCB 610 and the fixing protrusion 455.

A second through-hole 454 communicating with the first through-hole 444 and through which the wiring or harness passes is formed in a substantially central portion of the PCB support part 450. When the PCB support part 450 and the PCB cover 440 are coupled, the second through-hole 454 and the first through-hole 444 may be vertically aligned. The wiring or the harness may pass through the aligned first and second through-holes 444 and 454.

A second leg groove 456 into which at least a portion of the leg 410 can be inserted is formed in the edge of the PCB support part 450. The leg 410 is coupled to the PCB cover 440 and the PCB support part 450 through the first and second leg grooves 446 and 456, passes through a leg insertion part 196 of the first discharge guide 190, and may be supported by the leg support part 187 of the second air guide 180.

The partitioning part 400 includes a lever support device 460. The lever support device 460 may be coupled to the upper side of the leg 410 and support the second lever device 242 of the second blower 200.

The lever support device 460 has a substantially annular shape. The lever support device 460 includes a third space part 464 defining an installation space in which the PCB support part 450 and the second PCB 610 may be positioned. The third space part 464 is formed in a substantially central portion of the lever support device 460.

The lever support device 460 further includes a leg coupling part 462 coupled to an upper portion of the leg 410. The leg coupling part 462 is provided on the edge of the lever support device 460, and a plurality of the leg coupling parts 462 may be provided corresponding to the number of the legs 410. In other words, the upper end part of the leg 410 may be coupled to the leg coupling part 462, and the lower end part thereof may be supported by the leg support part 187 of the second air guide 180.

The lever support device 460 includes a blocking part 461 that blocks the air discharged through the first discharge part 105 from flowing into the second blower 200. The blocking part 461 may be understood as a main body part of the lever support device 460 having an annular shape.

The lever support device 460 may be fixed to a lower portion of the second blower 200. The PCB support part 450 and the space part cover 440 may be fixed to the lever support device 460. In other words, the lever support device 460 may be coupled to the lower portion of the second blower 200, and the partitioning part 400 may be fixed to the second blower 200.

In the present embodiment, the second PCB part 600 is installed inside the partitioning part 400. The second PCB part 600 may be disposed in the third space part 464. The second PCB part 600 includes a second PCB 610. The second PCB 610 may control components included in the second blower 200. The second PCB 610 may be referred to as a second controller 610.

The second PCB part 600 may include a second support plate 620 and a second support 625. The second support plate 620 may be formed in a plate shape. The second PCB 610 may be fixed to the second support plate 620. The second PCB 610 may be positioned on a bottom surface of the second support plate 620. In this embodiment, the second support plate 620 may be disposed below the second PCB 610. The second support 625 may be formed by extending the bottom surface of the space part cover 440 downward. The second support 625 may be coupled to the upper surface of the second support plate 620.

The second PCB part 600 includes a power receiver 630. The power receiver 630 may receive power transmitted from the power transmitter 530 of the first blower 100. The power receiver 630 may be disposed on a bottom surface of the second support plate 620 to face the power transmitter 530. When the space part cover 440 shields the second space part 194, the power transmitter 530 and the power receiver 630 face each other, and wireless power can be transmitted and received. In this embodiment, the power receiver 630 may be disposed inside the lower portion of the space part cover 440, and the second PCB 610 may be disposed above the PCB support part 450. The second PCB 610 and the power receiver 630 may be electrically connected to each other by wires or harnesses passing through the first and second through-holes 444 and 454. Meanwhile, when looking upward from the bottom of the partitioning part 400, the power receiver 630 may be exposed to the outside. Since the power receiver 630 is disposed to be exposed to the outside, when the space part cover 440 shields the second space part 194, the power transmitter 530 and the power receiver 630 may be positioned on the installation space part.

Meanwhile, the flow adjusting device 300 may be installed above the second discharge guide device 280. The flow adjusting device 300 may change the discharge direction of the air discharged from the second discharge guide device 280. The flow adjusting device 300 includes a second discharge part 305 through which the air flowing from the second discharge guide device 280 passes. The flow adjusting device 300 includes a third fan 330 for flowing air, and a third fan motor 335 for rotating the third fan 330. The air that has passed through the second discharge guide device 280 may be discharged through the second discharge part 305. In this embodiment, the flow adjusting device 300 may be rotated in the left and right direction and in the vertical direction at the upper side of the second discharge guide device 280. In other words, the flow adjusting device 300 may change the discharge direction so that the air is discharged in the vertical direction and the left and right direction. The rotation in the left and right direction may be referred to as a first direction rotation, and the rotation in the vertical direction may be referred to as a second direction rotation. A first guide device for guiding the rotation in the first direction and a second guide device for guiding the rotation in the second direction are further provided between the flow adjusting device 300 and the second discharge guide device 280.

Figure 11:
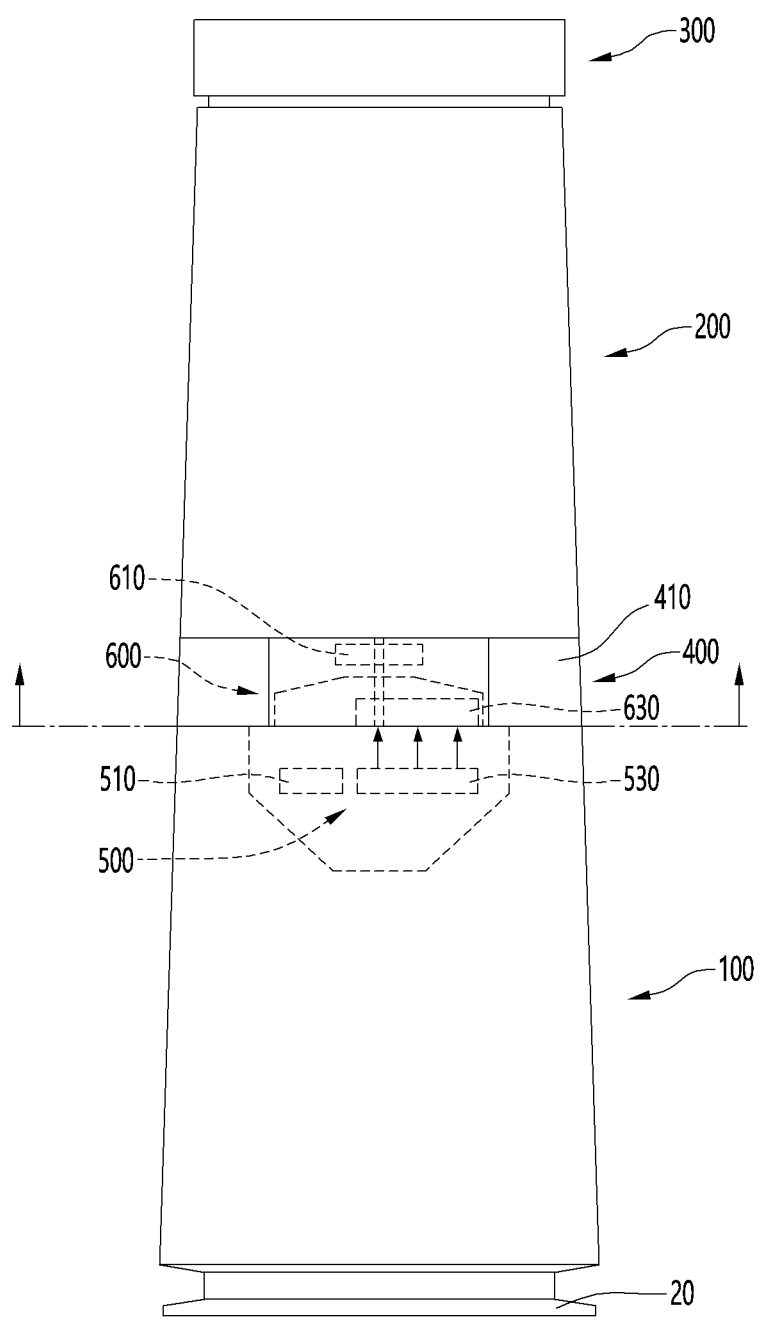
FIG. 11 is a view illustrating a state where the first blower and the second blower are coupled according to an embodiment of the present disclosure.
Figure 12:
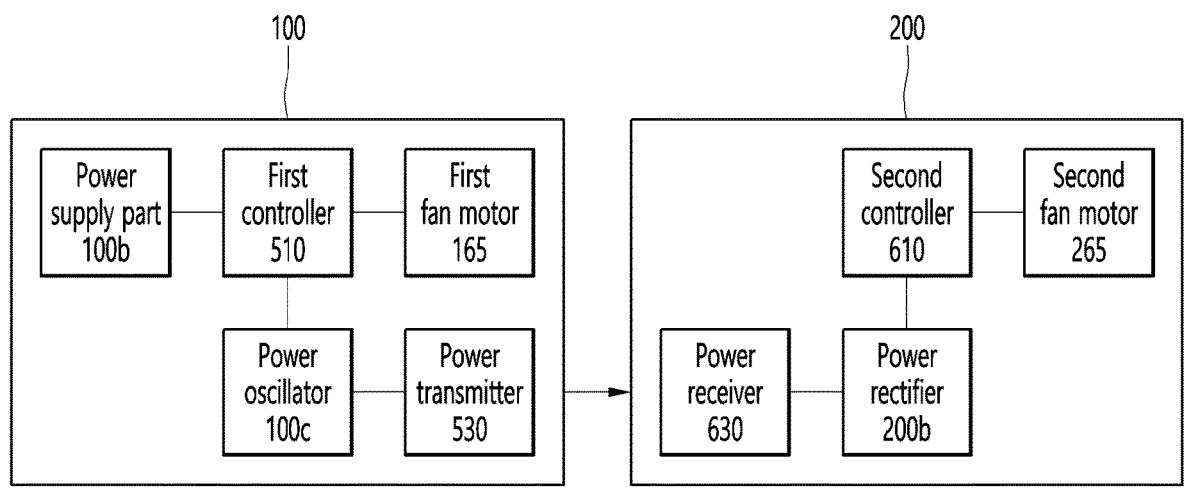
FIG. 12 is a view illustrating a state where power is supplied from a first blower to a second blower according to an embodiment of the present disclosure.
Figure 13:
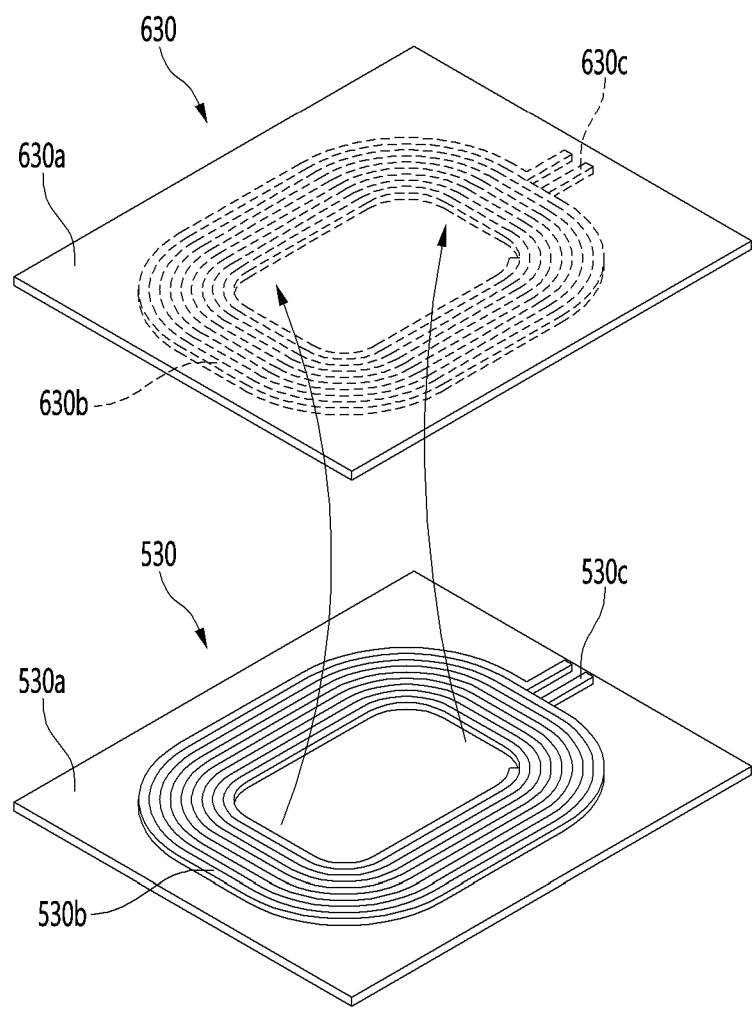
FIG. 13 is a view illustrating a state of a power transmitter and a power receiver according to an embodiment of the present disclosure.

FIG. 11 is a view illustrating a state where the first blower and the second blower are coupled according to an embodiment of the present disclosure, FIG. 12 is a view illustrating a state where power is supplied from a first blower to a second blower according to an embodiment of the present disclosure, and FIG. 13 is a view illustrating a state of a power transmitter and a power receiver according to an embodiment of the present disclosure.

Referring to FIGS. 11 to 13, the first blower 100 and the second blower 200 of the air purifier 10 according to the present disclosure may be coupled or separated. When the first blower 100 and the second blower 200 are coupled, it can be operated as a two-stage air purifier. When the first blower 100 and the second blower 200 are separated, it can be operated as a single-stage air purifier. In this embodiment, the second blower 200 and the partitioning part 400 are separated upward with respect to the first discharge guide 190 of the first blower 100 or can be coupled to the first blower 100. In this case, the second blower 200 and the partitioning part 400 may be understood as one second blower 200.

The first blower 100 may include a power transmitter 530 for transmitting wireless power to the second blower 200. The second blower 200 may include a power receiver 630 for receiving the wireless power transmitted from the power transmitter 530. The power transmitter 530 and the power receiver 630 may be operated when the second blower 200 is coupled to the first blower 100. In this embodiment, wireless power is transmitted from the first blower 100 to the second blower 200, but wireless power may be configured to be transmitted from the second blower 200 to the first blower 100.

When the second blower 200 is coupled to the first blower 100, the power transmitter 530 and the power receiver 630 may be positioned in an installation space part. The installation space part may be defined as a space formed by communicating with at least one of the motor receiving part 173, the first space part 184, the second space part 194, and the third space part 464. In this embodiment, the installation space part may be formed by communicating with first space part 184, the second space part 194, and a portion of the third space part 464 in which the space part cover 440 is positioned. The power transmitter 530 and the power receiver 630 can transmit and receive wireless power within the installation space part defined as one space. The third space part 464 may be referred to as an upper space part forming a part of the installation space part.

Hereinafter, a configuration provided in the first blower 100 will be described.

The first blower 100 may include a first controller 510. The first controller 510 may be understood as the first PCB 510 of the first PCB part 500. The first controller 510 may control the operation of the first blower 100. The first controller 510 may control the operation of the power transmitter 530, which will be described below. Wireless power may be transmitted from the power transmitter 530 under the control of the first controller 510. The first controller 510 may control the operation of the power oscillator 100c, which will be described below.

The first blower 100 may include a power supply part 100b. The power supply part 100b may supply power to the first controller 510. The power supply part 100b may supply power to be transmitted from a power transmitter 530 to be described below. The power supply part 100b may be understood as a configuration that supplies power for operating the first blower 100.

The first blower 100 may include a power transmitter 530. The power transmitter 530 may be disposed inside the first blower 100. For example, the power transmitter 530 may be disposed in an installation space part formed inside the first blower 100. In this embodiment, the power transmitter 530 may transmit wireless power upward. The configuration of the power transmitter 530 may be changed according to a wireless power transfer method. For example, the power transmitter 530 may be provided as a coil, an antenna, a resonator, or the like. In this embodiment, the power transmitter 530 may transmit wireless power by a magnetic induction method or a magnetic resonance method. When the power transmitter 530 is provided in a magnetic induction method, the power transmitter 530 and the power receiver 630 are disposed to face each other and may be disposed close to each other. When the power transmitter 530 is provided in a magnetic resonance method, the power transmitter 530 and the power receiver 630 may transmit and receive wireless power even if the power transmitter 530 and the power receiver 630 are spaced apart by a predetermined distance.

The first blower 100 may include a power oscillator 100c. The power oscillator 100c may adjust the frequency of the wireless power transmitted from the power transmitter 530. In this case, the frequency adjusted by the power oscillator 100c may be understood as a resonant frequency of the wireless power that can be received by the power receiver 630 to be described below. The wireless power adjusted to a specific frequency by the power oscillator 100c may be transmitted from the power transmitter 530. The operation of the power oscillator 100c may be controlled by the first controller 510. Although referred to as the power oscillator 100c in this embodiment, the power oscillator may also be referred to as a power amplifier, a power resonator, or the like.

The first blower 100 may include a first fan motor 165. The operation of the first fan motor 165 may be controlled by the first controller 510. The first fan motor 165 may be operated by power supplied to the power supply part 100b. When the first fan motor 165 is operated, an air flow that is suctioned into the first suctioning part 102 of the first blower 100 and then discharged to the first discharge part 105 may be generated.

Hereinafter, a configuration provided in the second blower 200 will be described.

The second blower 200 may include a second controller 610. The second controller 610 may control the operation of the second blower 200. The second controller 610 may be understood as a second PCB 610 of the second PCB part 600. The second controller 610 may control the operation of the power receiver 630 to be described below. The wireless power received by the power receiver 630 under the control of the second controller 610 may be supplied to a second fan motor 265 to be described below. The second controller 610 may control the operation of the power rectifier 200b, which will be described below.

The second blower 200 may include a power receiver 630. The power receiver 630 may receive wireless power transmitted from the power transmitter 530. The power receiver 630 may be disposed above the power transmitter 530. The power receiver 630 may be disposed in one space with the power transmitter 530. For example, the power receiver 630 may be disposed inside the partitioning part 400. The power receiver 630 may be positioned in the third space part 464 of the partitioning part 400. The power receiver 630 may be disposed on the installation space part when the partitioning part 400 is coupled to the first blower 100.

The operation of the power receiver 630 may be controlled by the second controller 610. The wireless power received by the power receiver 630 may be rectified by a power rectifier 200b to be described below and then supplied to the second fan motor 265. The configuration of the power receiver 630 may be changed according to a wireless power transfer method. For example, the power receiver 630 may be provided as a coil, an antenna, a resonator, or the like. In this embodiment, the power receiver 630 may be configured in a method corresponding to the power transmitter 530 among a magnetic induction method or a magnetic resonance method capable of receiving wireless power transmitted from the power transmitter 530.

The second blower 200 may include a power rectifier 200b. The power rectifier 200b may adjust the frequency of the wireless power received by the power receiver 630 to the frequency of power that can be consumed by the second fan motor 265. Power rectified by the power rectifier 200b may be supplied to the second fan motor 265. The operation of the power rectifier 200b may be controlled by the second controller 610. Although referred to as the power rectifier 200b in the present embodiment, the power rectifier may also be referred to as a power regulator, a power converter, or the like.

The second blower 200 may include a second fan motor 265. The second fan motor 265 may generate a flow of air that is suctioned into the second suctioning part 202 and then flows to the second discharge part 305. In this embodiment, the second fan motor 265 may be operated by the power received by the power receiver 630. The operation of the second fan motor 265 may be controlled by the second controller 610.

Meanwhile, the flow adjusting device 300 coupled to the second blower 200 may be operated by receiving power from the second blower 200. Alternatively, a power transmitter and a power receiver for transmitting and receiving wireless power may be further included between the second blower 200 and the flow adjusting device 300.

In addition, when the second blower 200 is separated from the first blower 100, the power supply may be cut off. Accordingly, the second blower 200 may further include a battery for operating the second blower 200. The battery may be disposed inside the second blower 200. The battery may be charged by wireless power received by the power receiver 630. The battery may be understood as a power supply part that enables the second blower 200 to operate even when the second blower 200 is separated from the first blower 100. An operation of the battery, such as charging of the battery, may be controlled by the second controller 610.

Hereinafter, the configuration of the power transmitter 530 and the power receiver 630 will be described in detail.

The power transmitter 530 according to the present disclosure may be configured to transmit wireless power. The power receiver 630 may be configured to receive the wireless power transmitted from the power transmitter 530. In this embodiment, the power transmitter 530 and the power receiver 630 may transmit and receive wireless power using a magnetic induction method or a magnetic resonance method. In addition, the power transmitter 530 and the power receiver 630 are disposed to face each other, and the wireless power transmitted from the power transmitter 530 may be received by the power receiver 630. Hereinafter, the structures of the power transmitter 530 and the power receiver 630 configured to transmit and receive wireless power will be described. In this embodiment, the power transmitter 530 and the power receiver 630 may be formed in a coil structure. In this case, the power transmitter 530 may be defined as a primary coil, and the power receiver 630 may be defined as a secondary coil. In other words, the wireless power transmitted from the power transmitter 530 serving as the primary coil may be received by the power receiver 630 serving as the secondary coil.

The power transmitter 530 may include a first coil 530b and a first coil support part 530a. The first coil 530b may be provided in a state of being wound in a specific shape. For example, the first coil 530b may be supported by the first coil support part 530a in a circularly wound state. The first coil 530b may be installed in the first blower 100 in a state of being supported by the first coil support part 530a. A seating groove in which the first coil 530b can be seated may be formed in the first coil support part 530a.

The power transmitter 530 may include a first terminal 530c. The first terminal 530c may be defined as one end portion and the other end portion of the first coil 530b wound in a circle. The first terminal 530c may electrically connect the power transmitter 530 and the first controller 510. In other words, electricity may be applied to the first coil 530*b* through the first terminal 530*c*. The first controller 510 may adjust whether to supply power to the second blower 200 by adjusting whether to transmit wireless power from the power transmitter 530.

When a current is applied to the first coil 530*b* of the power transmitter 530, an electromagnetic field may be generated in the first coil 530*b*. The electromagnetic field generated in the first coil 530*b* may cause an electromotive force to be induced in the second coil 630*b* of the power receiver 630, which will be described below. When an electromotive force is induced in the second coil 630*b*, a current may flow in the second coil 630*b* to transmit power to the power receiver 630.

The power receiver 630 may include a second coil 630*b* and a second coil support part 630*a*. The second coil 630*b* may be provided in a wound state in a specific shape. For example, the second coil 630*b* may be supported by the second coil support part 630*a* in a circularly wound state. The second coil 630*b* may be installed in the second blower 200 in a state of being supported by the second coil support 630*a*. A seating groove in which the second coil 630*b* can be seated may be formed in the second coil support part 630*a*.

The power receiver 630 may include a second terminal 630*c*. The second terminal 630*c* may be defined as one end portion and the other end portion of the second coil 630*b* wound in a circle. The second terminal 630*c* may electrically connect the power receiver 630 and the second controller 610. In other words, electricity may be applied to the second controller 610 through the second terminal 630*c*.

The second coil 630*b* of the power receiver 630 may receive the electromagnetic field generated by the first coil 530*b*. When an electromagnetic field is applied to the second coil 630*b*, an electromotive force may be induced in the second coil 630*b*. When an electromotive force is induced in the second coil 630*b*, a current may flow in the power receiver 630, and power may be supplied to the second power receiver 630. When the electromagnetic field generated by the power transmitter 530 is not received by the power receiver 630, the power supply may be stopped. When the power supply to the power receiver 630 is stopped, the power supply to the second blower 200 may be stopped.

Figure 14:
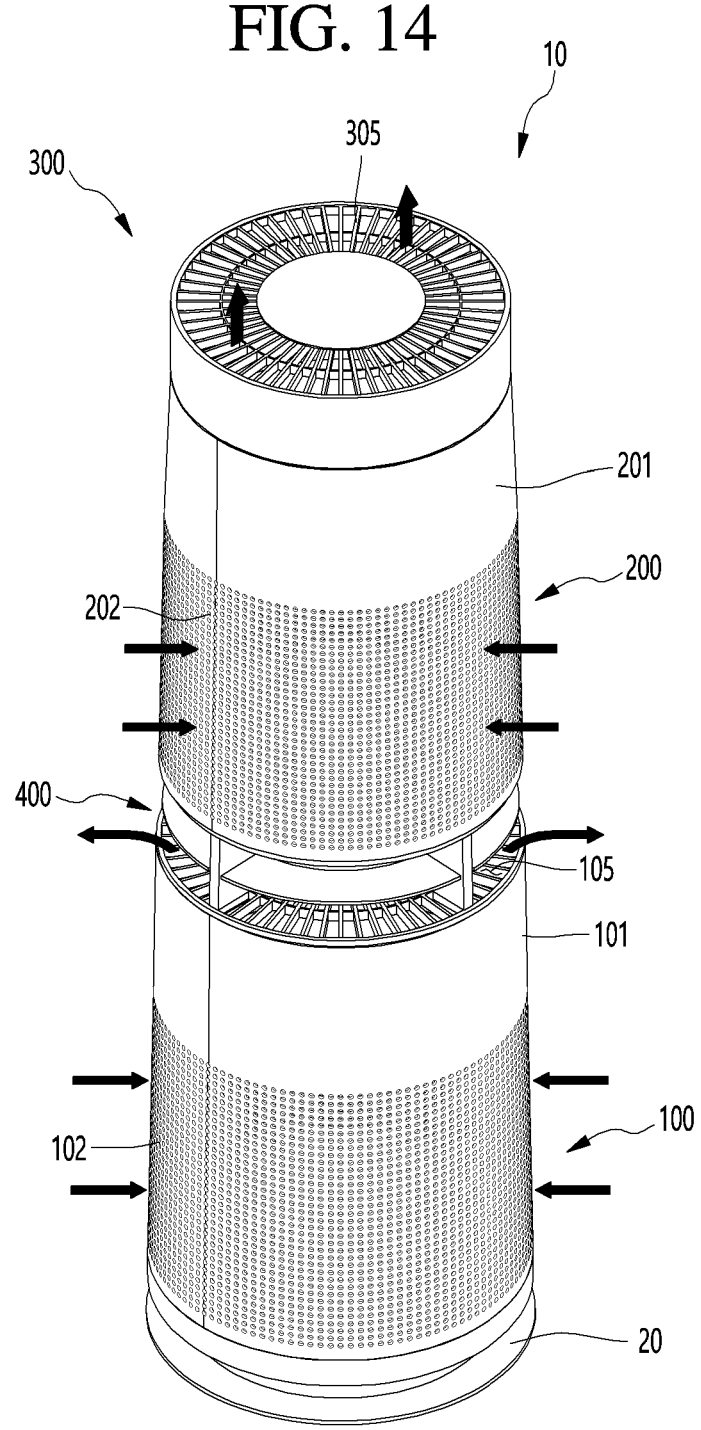
FIGS. 14 to 16 are views illustrating a state where air flows in the air purifier according to an embodiment of the present disclosure.
Figure 15:
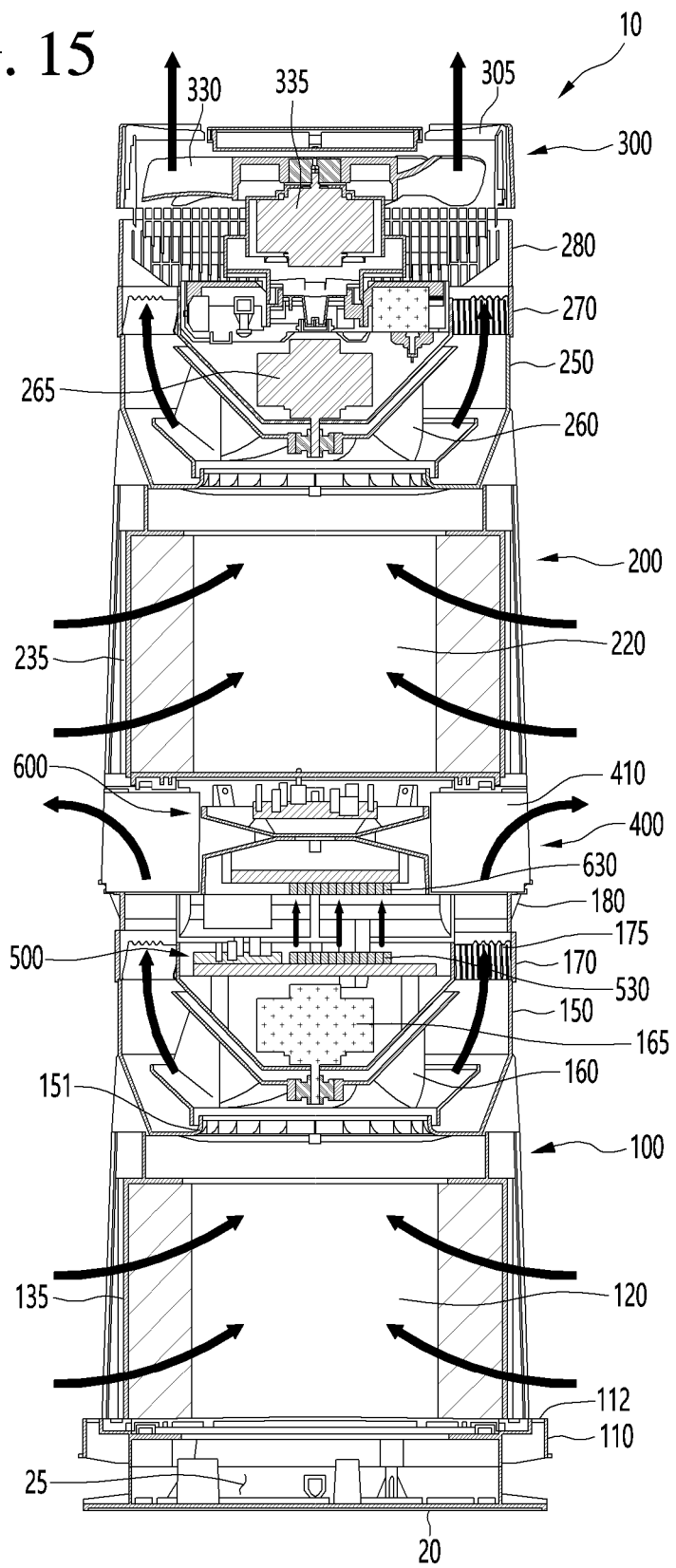
Figure 16:
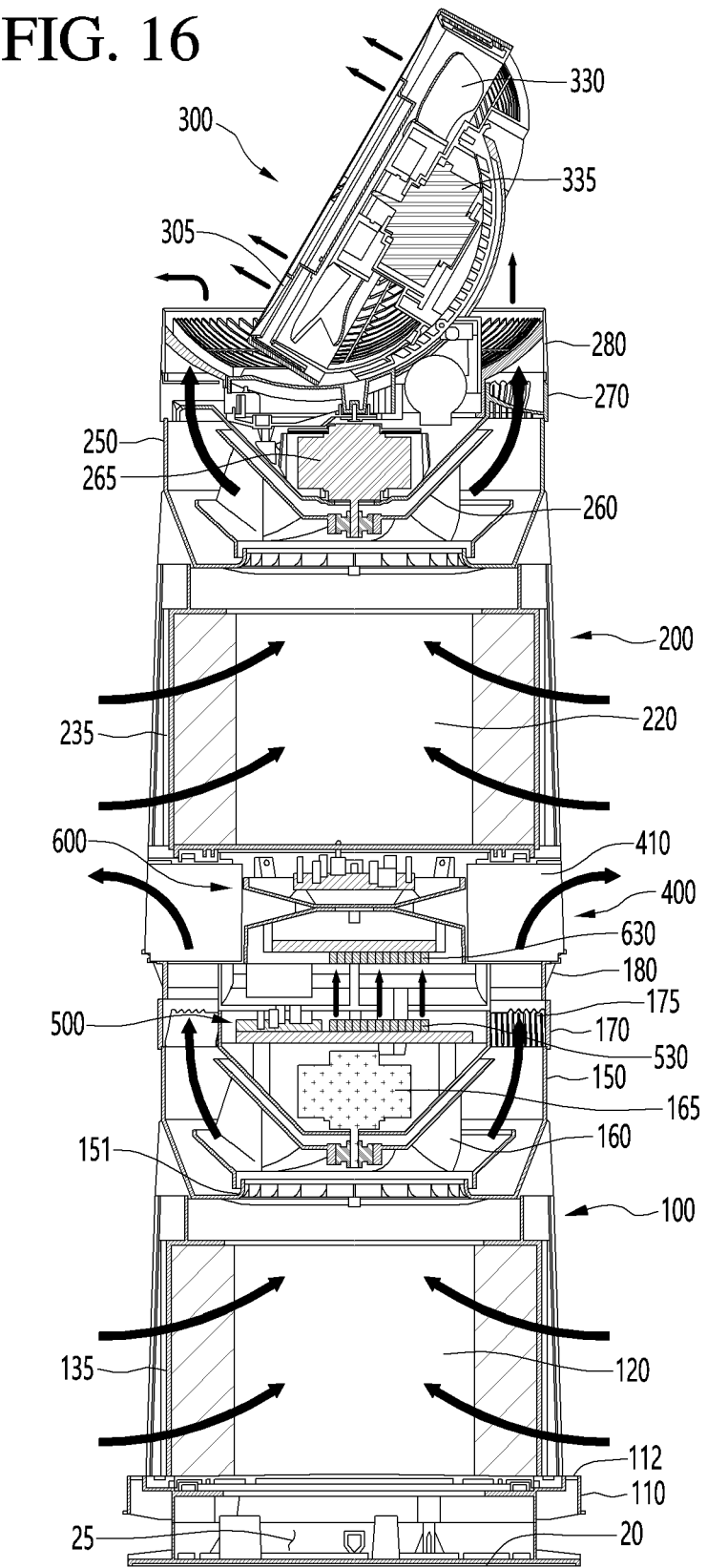

FIGS. 14 to 16 are views illustrating a state where air flows in the air purifier according to an embodiment of the present disclosure.

When the first fan 160 is driven, indoor air is suctioned into the first case 101 through the first suctioning part 102 and the base suctioning part 103. The suctioned air passes through the first filter member 120, and, in this process, foreign substances in the air may be filtered. In addition, while the air passes through the first filter member 120, the air is suctioned in the radial direction of the first filter member 120 and filtered, and then flows upward.

The air that has passed through the first filter member 120 flows radially upward while passing through the first fan 160, and a stable upward flow is achieved while passing through the first and second air guides 170 and 180. The air passing through the first and second air guides 170 and 180 passes through the first discharge guide 190 and flows upward through the first discharge part 105. The air discharged through the first discharge part 105 is guided by the partition plate 430 positioned above the first discharge guide 190 and discharged to the outside of the air purifier 10.

When the second fan 260 is driven, indoor air is suctioned into the second case 201 through the second suctioning part 202. The suctioned air passes through the second filter member 220, and in this process, foreign substances in the air may be filtered. In addition, while the air passes through the second filter member 220, the air is suctioned in the radial direction of the first filter member 120 and filtered, and then flows upward.

The air passing through the second filter member 220 flows upward in the radial direction while passing through the second fan 160, and a stable upward flow occurs while passing through the third air guide device 270 and the second discharge guide device 280. The air that has passed through the third air guide device 270 and the second discharge guide device 280 may be discharged through the second discharge part 305 via the flow adjusting device 300.

The flow adjusting device 300 may be rotatably provided on the upper side of the second blower 200 in the vertical direction and the left and right direction. For example, when the flow adjusting device 300 is in the first position lying as illustrated in FIG. 15, the air discharged from the flow adjusting device 300 flows upward. On the other hand, when the flow adjusting device 300 is in the second position erected as illustrated in FIG. 16, the air discharged from the flow adjusting device 300 may flow toward the front upper side. By the flow adjusting device 300, there is an advantage that the air volume discharged from the air purifier 10 is increased, and purified air can be supplied to a location far away from the air purifier 10.

In detail, when the third fan 330 of the flow adjusting device 300 is driven, at least a portion of the air discharged from the second discharge guide device 280 can flow into the third fan housing 310. In addition, the flowing air thereinto may pass through the third fan 330 and be discharged to the outside through the second discharge part 305.

Meanwhile, when the second blower 200 and the partitioning part 400 are coupled to the first blower 100, the power transmitter 530 of the first blower 100 can transmit wireless power. The wireless power transmitted from the power transmitter 530 may be received by the power receiver 630 of the second blower 200. When the power receiver 630 receives wireless power, power for operation may be supplied to the second blower 200.

On the other hand, when the second blower 200 and the partitioning part 400 are separated from the first blower 100, the second blower 200 may not be operated. According to the present disclosure, in order to operate the second blower 200, the wiring connected from the first blower 100 to the second blower 200 can be minimized. Accordingly, the structure of the air purifier 10 can be simplified. In addition, since the first blower 100 and the second blower 200 are configured to be easily coupled and separated, the convenience of assembling the air purifier can be improved. In addition, even when the first blower 100 and the second blower 200 are separated, each blower can be operated independently, thereby increasing the utility of the air purifier.

The invention claimed is:
1. An air purifier comprising:
 a first blower having a first fan configured to generate an air flow from a first suction part toward a first discharge part;
 a second blower having a second fan configured to generate an air flow from a second suction part toward a second discharge part;
 an installation space part configured to be formed between the first blower and the second blower;

a power transmitter configured to be positioned inside of the installation space part, to be fixed to any one of the first blower or the second blower, and to transmit a wireless power;

a power receiver configured to be positioned inside of the installation space part, to be fixed to the other one of the first blower or the second blower, and to receive the wireless power transmitted from the power transmitter; and a partitioning part configured to be disposed between the first blower and the second blower and to have an upper space part which forms a first part of the installation space part therein, wherein the first blower has a lower space part which forms a second part of the installation space part, wherein a first printed circuit board (PCB) part configured to control an operation of the first blower and the power transmitter are disposed inside of the lower space part, and wherein the partitioning part includes:

a PCB support part that is disposed inside of the upper space part and partitions a first part of the upper space part to receive a second PCB part; and a space part cover that is disposed inside of the upper space part and partitions a second part of the upper space part so that the power receiver is supported.

2. The air purifier of claim 1, wherein the second blower is fixed to an upper side of the partitioning part.

3. The air purifier of claim 1, wherein the second blower and the partitioning part are coupled to or separated from an upper side of the first blower, and wherein when the second blower and the partitioning part are coupled to the upper side of the first blower, the upper space part and the lower space part communicate with each other.

4. The air purifier of claim 1, wherein the first blower includes:

a first air guide having a motor receiving part in which a first fan motor configured to rotate the first fan is received;

a second air guide positioned above the first air guide and having a first space part; and a first discharge guide positioned above the second air guide and having a second space part, and wherein, in the lower space part, the motor receiving part, the first space part, and the second space part are formed to be vertically aligned.

5. The air purifier of claim 1, wherein the partitioning part further includes:

a lever support part fixed to a lower side of the second blower and having the upper space part.

6. The air purifier of claim 4, wherein the space part cover shields the second space part.

7. The air purifier of claim 1, wherein the lower space part includes:

a first support plate configured to support the first PCB part and the power transmitter; and a first support configured to fix the first support plate to the first air guide.

8. The air purifier of claim 7, wherein the upper space part includes:

a second support plate configured to support the second PCB part and the power receiver, and a second support configured to fix the second support plate to the space part cover.

9. The air purifier of claim 5, wherein through-holes aligned in a vertical direction are formed in the PCB support part and the space part cover.

10. The air purifier of claim 1, further comprising:

a power supply part configured to supply power to the power transmitter, a power oscillator configured to adjust a frequency of the wireless power transmitted from the power transmitter, and a first controller configured to control an operation of the power transmitter and the power oscillator.

11. The air purifier of claim 10, further comprising:

a power rectifier configured to rectify the wireless power received by the power receiver; and a second controller configured to control an operation of the power receiver and the power rectifier.

12. The air purifier of claim 1, wherein a flow adjuster configured to adjust a flow direction of the discharged air is further provided on an upper side of the second blower, and wherein the flow adjuster is operated by receiving power from the second blower.

13. The air purifier of claim 1, wherein a battery is further provided in any one of the first blower or the second blower in which the power receiver is provided.

14. The air purifier of claim 1, wherein the second blower is seated above the first blower, and wherein, when the second blower is seated on the first blower, the power transmitter and the power receiver face each other in a vertical direction.

15. The air purifier of claim 1, wherein the power transmitter is positioned on an upper surface of the first blower, and wherein the power receiver is positioned on a lower surface of the second blower.

16. The air purifier of claim 1, wherein the power receiver is disposed inside a lower portion of the space part cover.

17. The air purifier of claim 1, wherein the second PCB part is disposed above the PCB support part.

* * * * *